US012280751B2

(12) United States Patent
Ryu et al.

(10) Patent No.: US 12,280,751 B2
(45) Date of Patent: Apr. 22, 2025

(54) ELECTRONIC BRAKE SYSTEM AND OPERATION METHOD THEREFOR

(71) Applicant: HL MANDO CORPORATION, Gyeonggi-do (KR)

(72) Inventors: Dongyo Ryu, Gyeonggi-do (KR); Chungjae Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 433 days.

(21) Appl. No.: 17/771,443

(22) PCT Filed: Oct. 23, 2020

(86) PCT No.: PCT/KR2020/014556
§ 371 (c)(1),
(2) Date: Apr. 22, 2022

(87) PCT Pub. No.: WO2021/080366
PCT Pub. Date: Apr. 29, 2021

(65) Prior Publication Data
US 2022/0396250 A1    Dec. 15, 2022

(30) Foreign Application Priority Data

Oct. 23, 2019  (KR) .................. 10-2019-0132295
Oct. 23, 2019  (KR) .................. 10-2019-0132305

(51) Int. Cl.
*B60T 8/34* (2006.01)
*B60T 8/32* (2006.01)
(Continued)

(52) U.S. Cl.
CPC ............ *B60T 13/686* (2013.01); *B60T 8/326* (2013.01); *B60T 8/4081* (2013.01);
(Continued)

(58) Field of Classification Search
CPC ...... B60T 8/326; B60T 8/4081; B60T 13/142; B60T 13/58
See application file for complete search history.

(56) References Cited

U.S. PATENT DOCUMENTS

2004/0040807 A1*  3/2004  Burgdorf .............. B60T 13/662
                                                                188/352
2004/0251740 A1* 12/2004  Schmidt ................. B60T 11/16
                                                                303/191
(Continued)

FOREIGN PATENT DOCUMENTS

JP         6-75938       10/1994
KR    10-2002-0052302    7/2002
(Continued)

OTHER PUBLICATIONS

International Search Report for PCT/KR2020/014556 mailed on Feb. 2, 2021 and its English Translation from WIPO (now published as WO 2021/080366).
(Continued)

*Primary Examiner* — Nicholas J Lane
(74) *Attorney, Agent, or Firm* — WOMBLE BOND DICKINSON (US) LLP

(57) ABSTRACT

The present disclosure relates to an electronic brake system and an operation method thereof. The electronic brake system prepares various valves provided on flow paths, that connect components and a reservoir, in a closed state, and then switches the various valves to an open state after a hydraulic pressure of a pressure medium is formed by a hydraulic supply device.

17 Claims, 9 Drawing Sheets

(51) Int. Cl.
- *B60T 8/40* (2006.01)
- *B60T 13/14* (2006.01)
- *B60T 13/58* (2006.01)
- *B60T 13/68* (2006.01)

(52) U.S. Cl.
CPC ............ *B60T 13/142* (2013.01); *B60T 13/58* (2013.01); *B60T 2270/402* (2013.01); *B60T 2270/404* (2013.01); *B60T 2270/82* (2013.01)

(56) References Cited

U.S. PATENT DOCUMENTS

| | | | | |
|---|---|---|---|---|
| 2006/0192426 | A1* | 8/2006 | Baechle | B60T 17/222 |
| | | | | 303/119.1 |
| 2008/0238186 | A1* | 10/2008 | Suzuki | B60T 8/367 |
| | | | | 303/20 |
| 2010/0066162 | A1 | 3/2010 | Isono | |
| 2015/0203086 | A1* | 7/2015 | Miyazaki | B60T 8/4081 |
| | | | | 60/545 |
| 2016/0297413 | A1* | 10/2016 | Alford | B60T 8/4081 |
| 2017/0072928 | A1* | 3/2017 | Kim | B60T 7/042 |
| 2017/0144642 | A1* | 5/2017 | Kim | B60T 13/745 |
| 2018/0111593 | A1* | 4/2018 | Kim | B60T 8/88 |
| 2018/0162338 | A1* | 6/2018 | Irwan | B60T 8/171 |
| 2018/0162340 | A1* | 6/2018 | Irwan | B60T 8/90 |
| 2018/0339692 | A1* | 11/2018 | Jeong | B60T 13/686 |
| 2019/0100185 | A1* | 4/2019 | Jeong | B60T 13/662 |
| 2019/0100187 | A1* | 4/2019 | Jeong | B60T 7/042 |
| 2019/0366997 | A1* | 12/2019 | Jeong | B60T 13/167 |
| 2020/0216054 | A1* | 7/2020 | Anderson | B60T 17/004 |
| 2020/0339096 | A1* | 10/2020 | Timm | B60T 13/745 |
| 2023/0347860 | A1* | 11/2023 | Ma | B60T 7/042 |

FOREIGN PATENT DOCUMENTS

| | | |
|---|---|---|
| KR | 10-2003-0026012 | 3/2003 |
| KR | 10-2019-0037795 | 4/2019 |

OTHER PUBLICATIONS

Written Opinion of the International Searching Authority for PCT/KR2020/014556 mailed on Feb. 2, 2021 and its English Translation by Google Translate (now published as WO 2021/080366).

* cited by examiner

[Fig. 1]
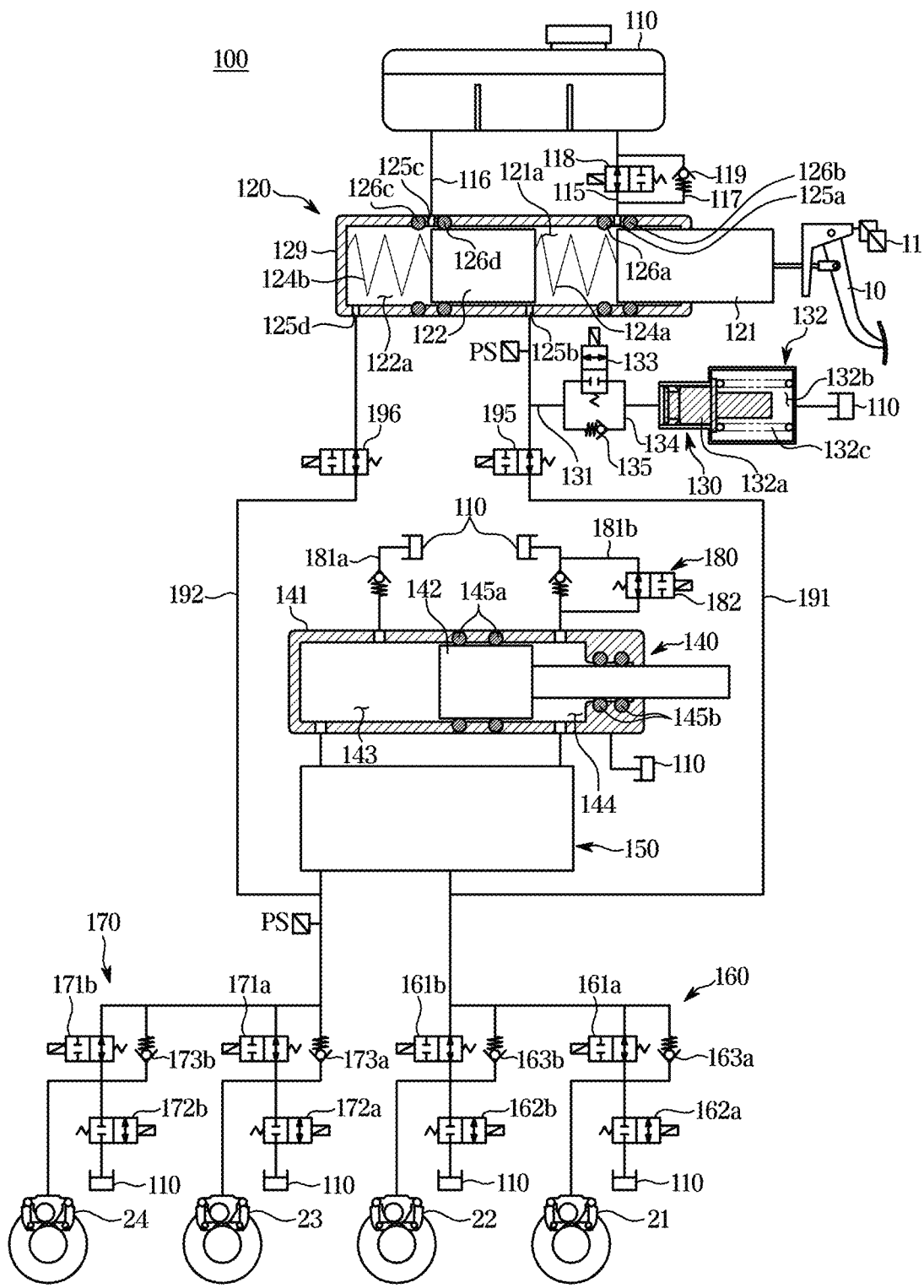

[Fig. 2]
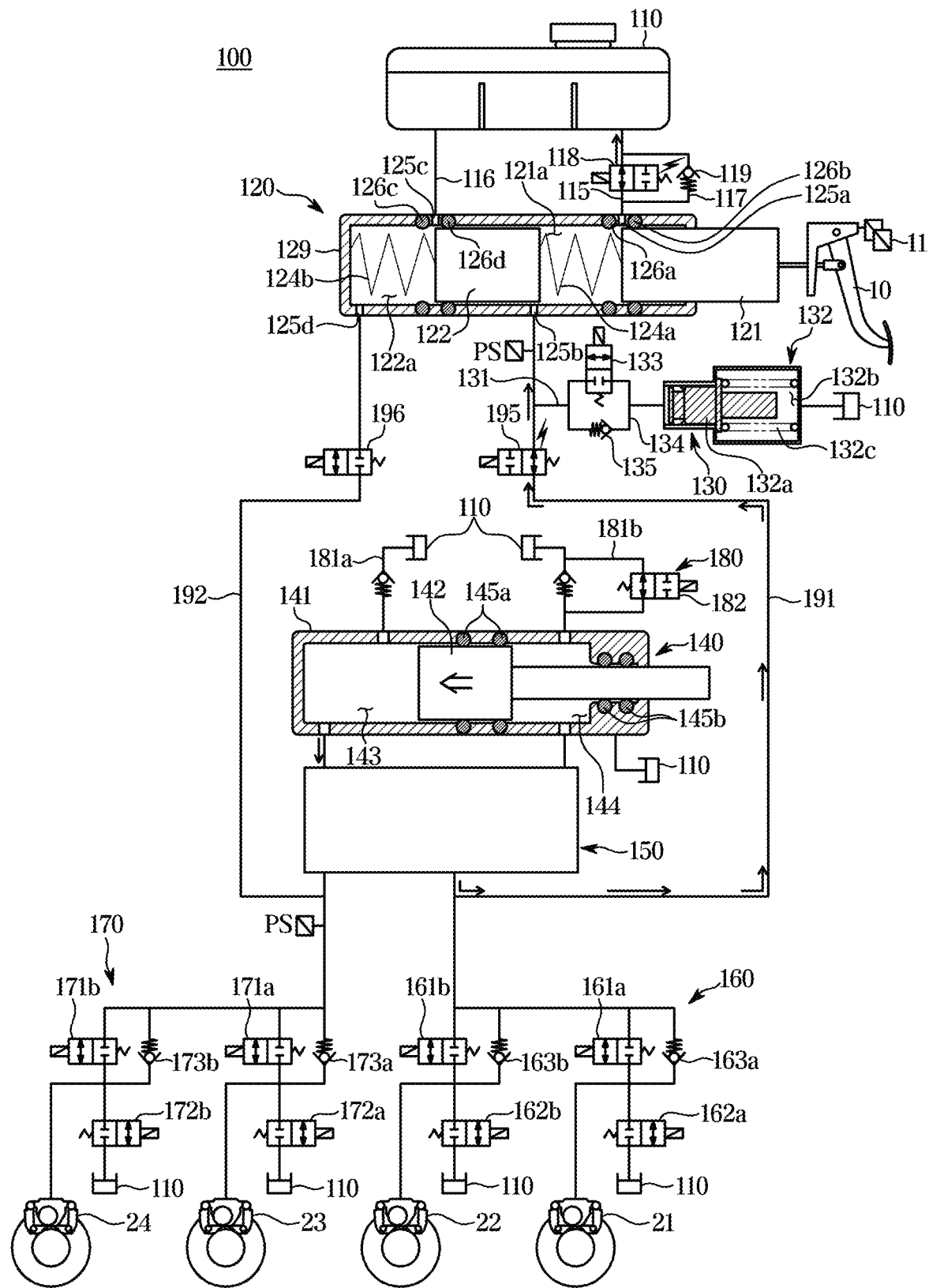

[Fig. 3]
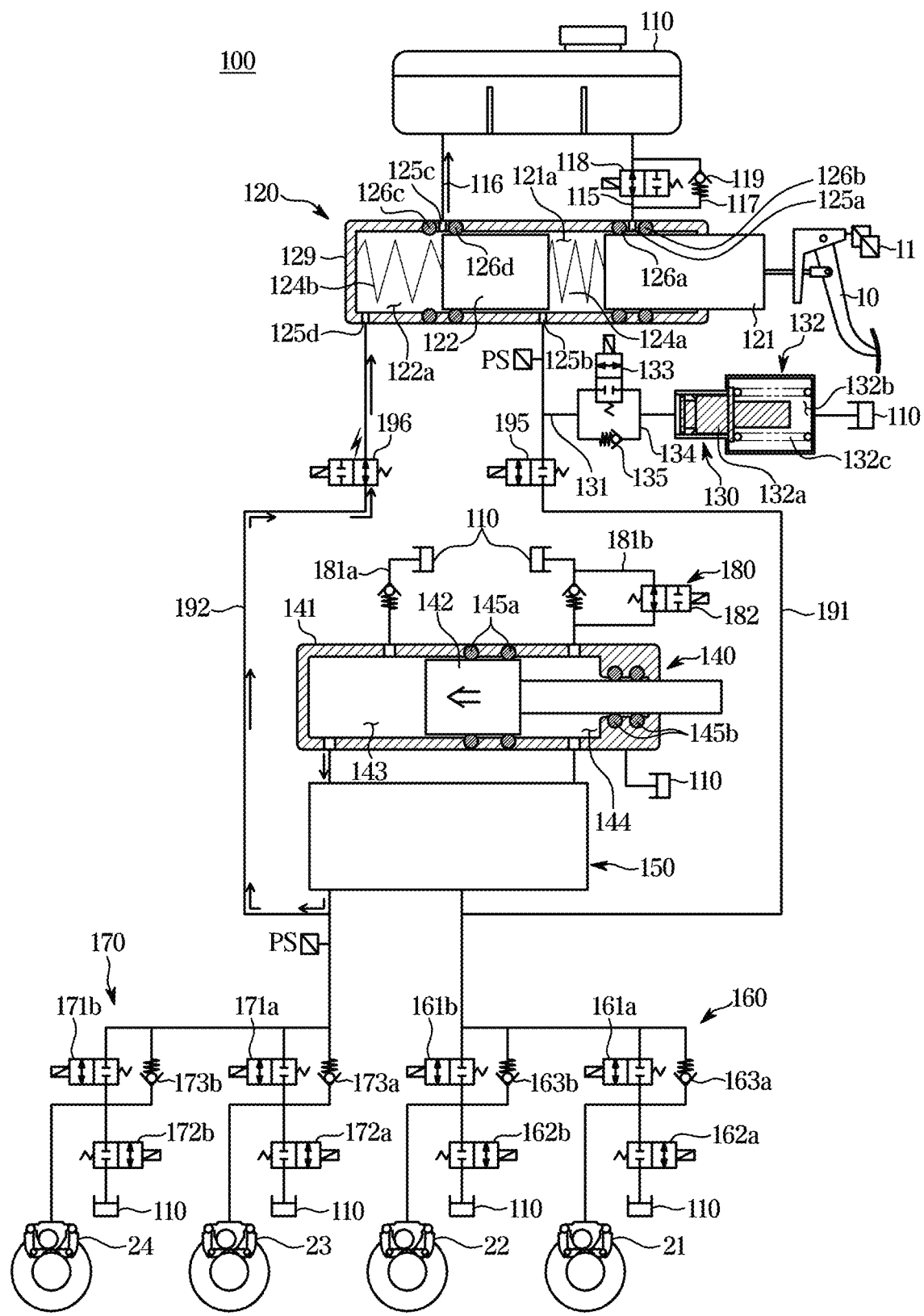

[Fig. 4]
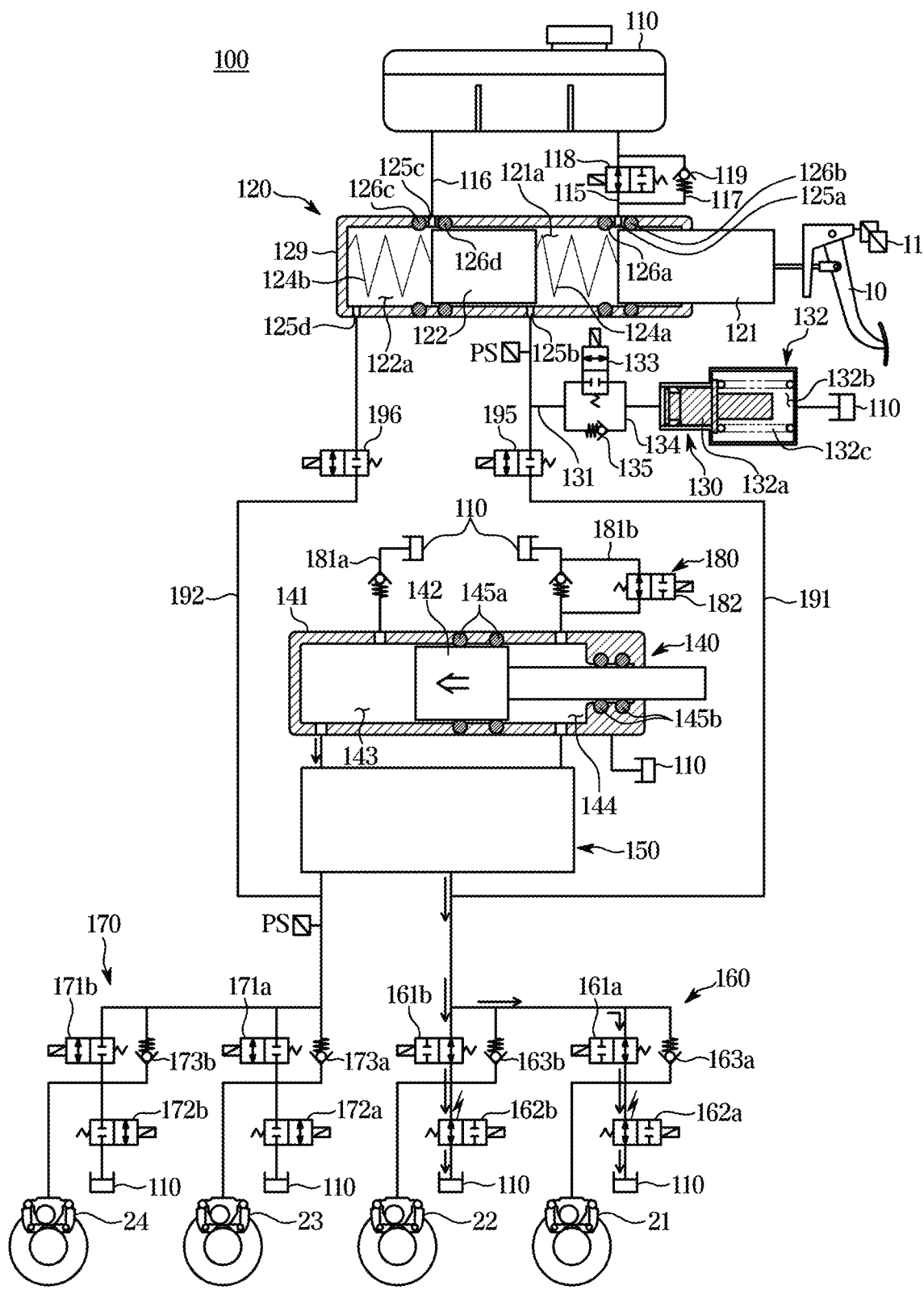

[Fig. 5]
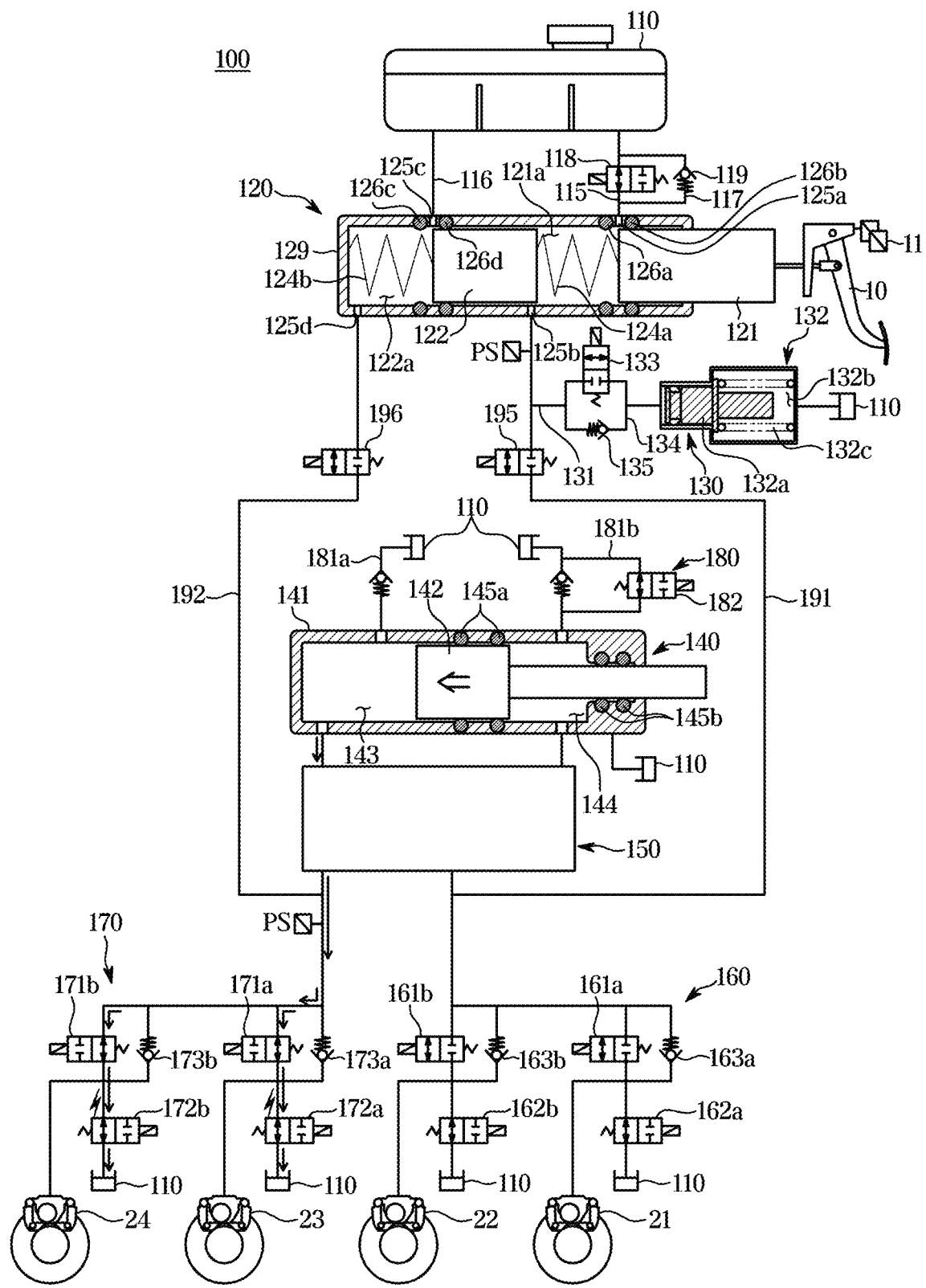

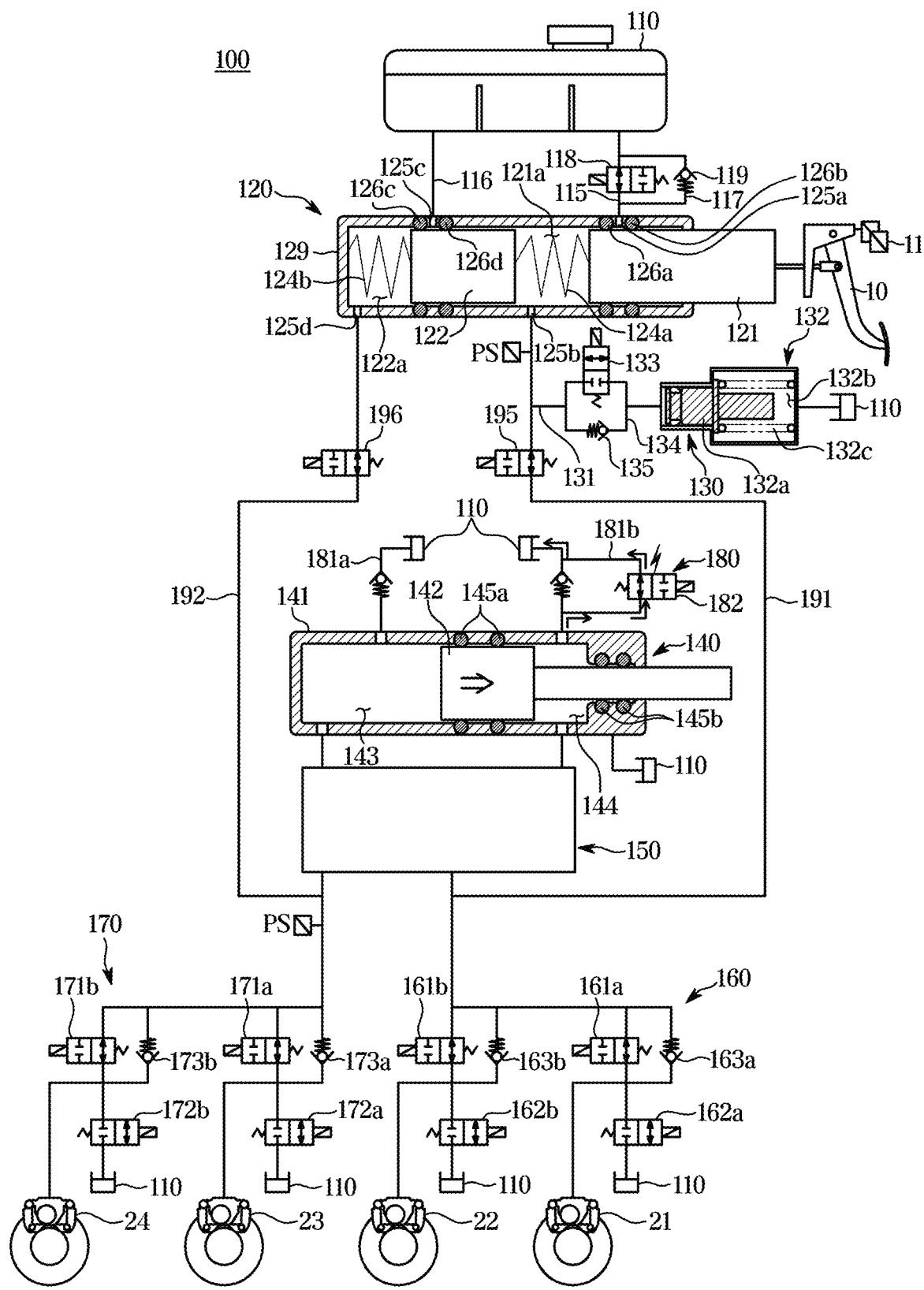
[Fig. 6]

[Fig. 7]
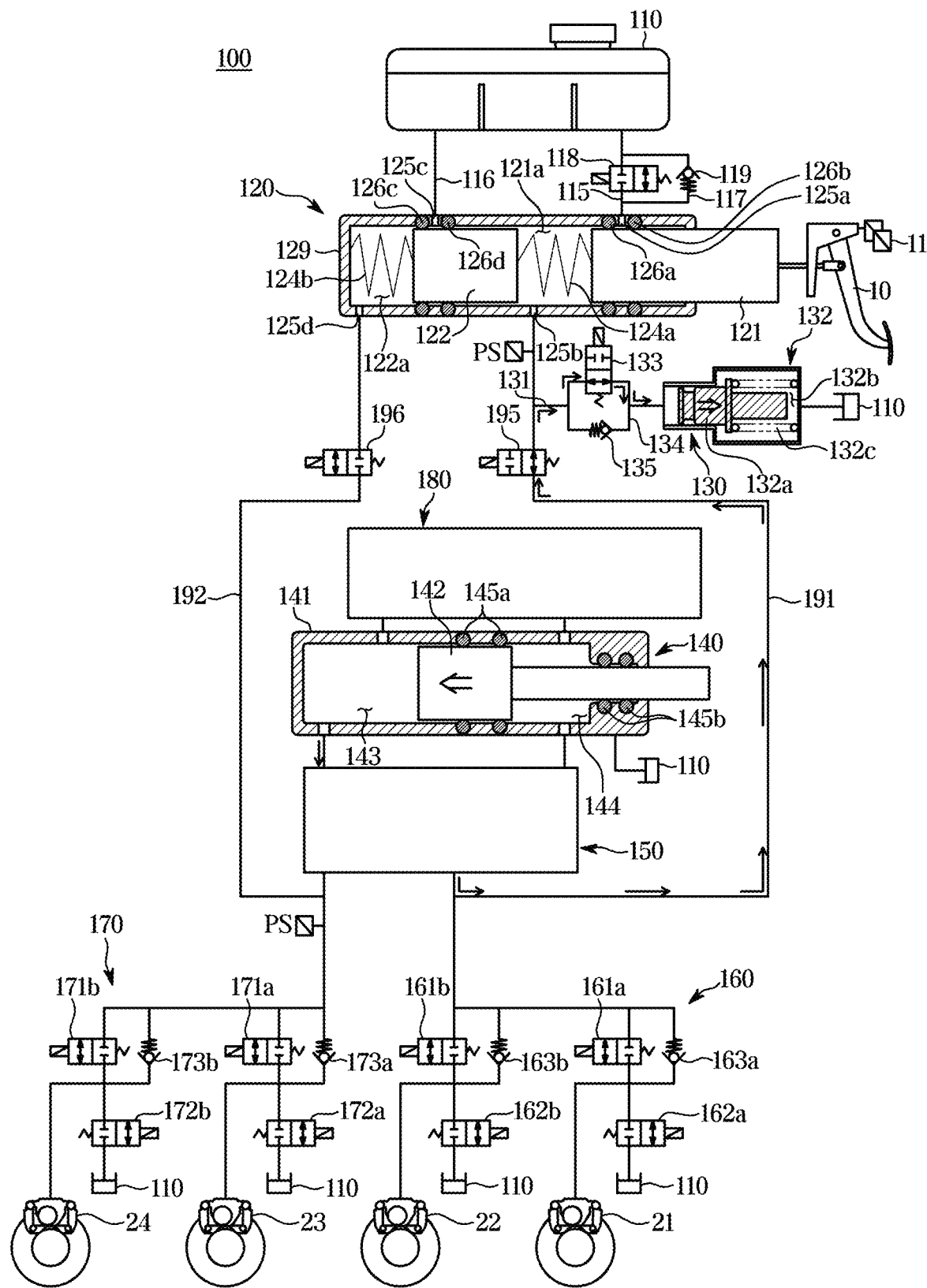

[Fig. 8]
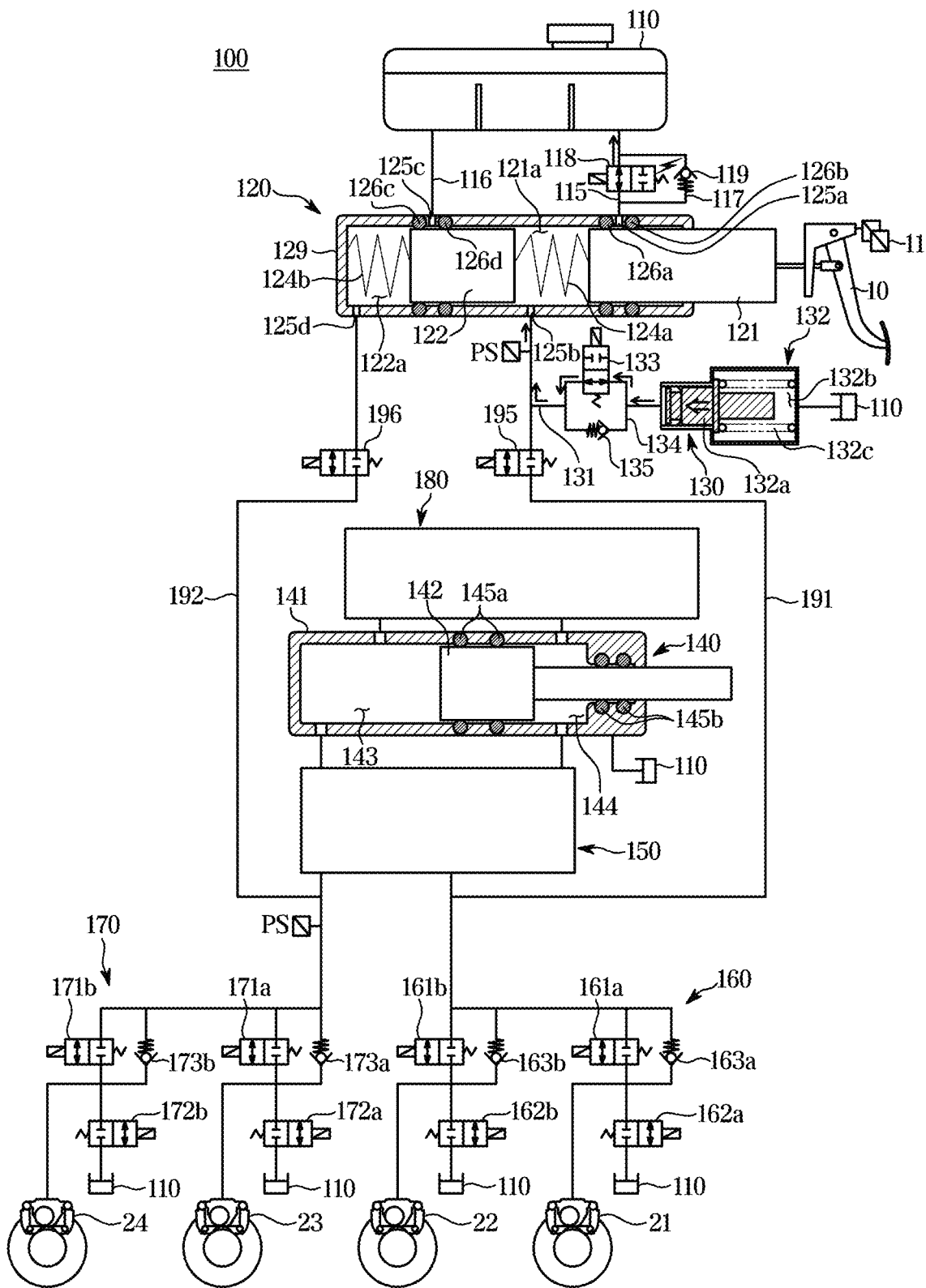

[Fig. 9]
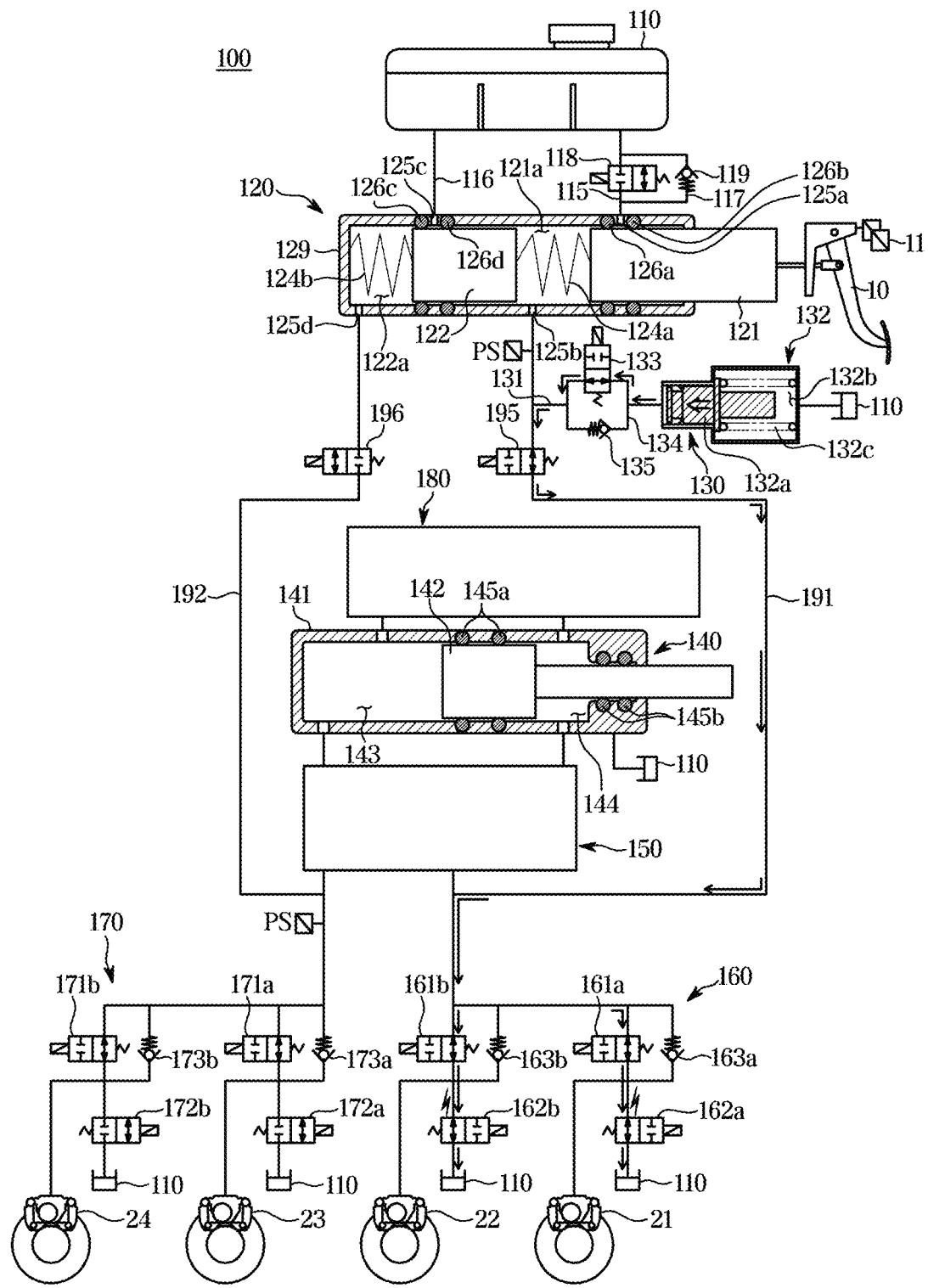

ELECTRONIC BRAKE SYSTEM AND OPERATION METHOD THEREFOR

CROSS-REFERENCE TO RELATED APPLICATIONS

The present application is the national stage of International Patent Application No. PCT/KR2020/014556 filed on Oct. 23, 2020, which claims the priority to Korean Patent Application No. 10-2019-0132295 filed in the Korean Intellectual Property Office on Oct. 23, 2019 and Korean Patent Application No. 10-2019-0132305 filed in the Korean Intellectual Property Office on Oct. 23, 2019, the entire contents of which are incorporated herein by reference.

TECHNICAL FIELD

The present disclosure relates to an electronic brake system and an operation method thereof, and more particularly, to an electronic brake system and an operation method thereof for generating a braking force using an electrical signal output in response to displacement of a brake pedal.

BACKGROUND ART

In general, vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system including a hydraulic pressure supply device that receives an electrical signal output in response to a pressing force by a driver from a pedal displacement sensor detecting displacement of a brake pedal when the driver depresses the brake pedal to supply a hydraulic pressure required for braking to wheel cylinders, has been widely used.

In such an electronic brake system, an electrical signal is generated and provided when a driver depresses the brake pedal in a normal operation mode, and based on the electric signal, the hydraulic pressure supply device is electrically operated and controlled to generate a hydraulic pressure required for braking and transfer the hydraulic pressure to the wheel cylinders. As such, such an electronic brake system is electrically operated and controlled so that complex and various braking operations may be implemented, but when a technical problem occurs in an electric component, a hydraulic pressure required for braking may not be stably generated, and thus the safety of passengers may not be secured.

Therefore, the electronic brake system enters an abnormal operation mode when a component fails or becomes out of control, and in this case, a mechanism is required in which the operation of the brake pedal by a driver is directly linked to the wheel cylinders. That is, in the abnormal operation mode in the electronic brake system, as the driver depresses the brake pedal, a hydraulic pressure required for braking needs to be generated immediately and transferred directly to the wheel cylinders.

On the other hand, air may be introduced into the brake system due to repeated braking operations or external factors in the process of generating a hydraulic pressure using a pressurized medium. When air is present in the brake system, it becomes difficult to generate a stable hydraulic pressure, which not only deteriorates the braking performance of a vehicle, but also affects the feeling of a driver of operating the brake pedal and cause a sense of heterogeneity. Therefore, a method for removing or discharging the air introduced into the brake system is required.

DISCLOSURE

Technical Problem

The present disclosure is directed to providing an electronic brake system capable of effectively removing and discharging air introduced into the system, and an operation method thereof.

The present disclosure is directed to providing an electronic brake system capable of quickly removing and discharging air introduced into the system through a simple structure and operation, and an operation method thereof.

The present disclosure is directed to providing an electronic brake system with improved braking performance and operational reliability, and an operation method thereof.

The present disclosure is directed to providing an electronic brake system capable of implementing stable and effective braking in various operating situations, and an operation method thereof.

Technical Solution

An aspect of the present disclosure provides an electronic brake system including a reservoir in which a pressurized medium is stored, a master cylinder including a master piston connected to a brake pedal and a master chamber provided to have a volume variable by displacement of the master piston, a hydraulic pressure supply device provided to generate a hydraulic pressure by operating the hydraulic piston in response to an electrical signal output in response to the displacement of the brake pedal, a dump controller including a dump flow path connecting the hydraulic pressure supply device and the reservoir, and a dump valve provided on the dump flow path to control a flow of the pressurized medium, a hydraulic control unit including a plurality of flow paths and valves to control the hydraulic pressure provided from the hydraulic pressure supply device, a hydraulic circuit including a plurality of inlet valves provided to respectively control the flow of the pressurized medium to be introduced into a plurality of wheel cylinders, and a plurality of outlet valves provided to control the flow of the pressurized medium to be directly discharged from the plurality of wheel cylinders to the reservoir, a backup flow path connecting the master chamber and the hydraulic circuit and provided with a cut valve to control the flow of the pressurized medium, and a reservoir flow path connecting the master chamber and the reservoir, wherein at least one of the cut valve, the outlet valves, and the dump valve is switched to an open state after a hydraulic pressure of the pressurized medium is formed by the hydraulic pressure supply device in a closed state in order to discharge air introduced therein to the reservoir side.

The master cylinder may include a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit may include a first hydraulic circuit including first and second wheel cylinders, and a second hydraulic circuit including third and fourth wheel cylinders, the backup flow path may include a first backup flow path connecting the first master chamber and the first hydraulic circuit, and a second backup flow path connecting the second master chamber and the second hydraulic circuit, and the cut valve may include a first cut valve provided on the first backup flow path to control the flow of the pressurized medium, and a second cut valve provided on the second backup flow path to control the flow of the pressurized medium.

The reservoir flow path may include a first reservoir flow path connecting the first master chamber and the reservoir, and a second reservoir flow path connecting the second master chamber and the reservoir, the electronic brake system may further include an inspection valve provided on the first reservoir flow path to control the flow of the pressurized medium, and the inspection valve, together with the first cut valve, may be switched to an open state after a hydraulic pressure of the pressurized medium is formed by the hydraulic pressure supply device in a closed state in order to discharge the air introduced therein to the reservoir side.

The hydraulic pressure supply device may further include a first pressure chamber formed in front of the hydraulic piston and a second pressure chamber formed in the rear of the hydraulic piston, and when the air introduced therein is discharged to the reservoir side, may form a hydraulic pressure of the pressurized medium in the first pressure chamber by forward movement of the hydraulic piston or form a hydraulic pressure of the pressurized medium in the second pressure chamber by rearward movement of the hydraulic piston, and supply the pressurized medium having the hydraulic pressure to the hydraulic control unit.

The hydraulic circuit may include a first hydraulic circuit including first and second wheel cylinders, and a second hydraulic circuit including third and fourth wheel cylinders, the first hydraulic circuit may include first and second outlet valves provided to respectively control the flow of the pressurized medium to be discharged from the first and second wheel cylinders to the reservoir, and the second hydraulic circuit may include third and fourth outlet valves provided to respectively control the flow of the pressurized medium to be discharged from the third and fourth wheel cylinders to the reservoir.

The hydraulic pressure supply device may further include a first pressure chamber formed in front of the hydraulic piston and a second pressure chamber formed in the rear of the hydraulic piston, the dump flow path may include a first dump flow path connecting the first pressure chamber and the reservoir, and a second dump flow path connecting the second pressure chamber and the reservoir, and the dump valve may be provided on at least one of the first dump flow path and the second dump flow path.

Another aspect of the present disclosure provides an electronic brake system including a reservoir in which a pressurized medium is stored, a master cylinder including a master piston connected to a brake pedal and a master chamber provided to have a volume variable by displacement of the master piston, a hydraulic pressure supply device provided to generate a hydraulic pressure by operating the hydraulic piston in response to an electrical signal output in response to the displacement of the brake pedal, a hydraulic control unit including a plurality of flow paths and valves to control the hydraulic pressure provided from the hydraulic pressure supply device, a hydraulic circuit including a plurality of inlet valves provided to respectively control the flow of the pressurized medium to be introduced into a plurality of wheel cylinders, and a plurality of outlet valves provided to control the flow of the pressurized medium to be directly discharged from the plurality of wheel cylinders to the reservoir, a reservoir flow path connecting the master chamber and the reservoir, an inspection valve provided on the reservoir flow path to control the flow of the pressurized medium, a backup flow path connecting the master chamber and the hydraulic circuit, and a simulation device provided to provide a reaction force to a pressing force of the brake pedal, wherein the simulation device includes a simulation flow path branched from the backup flow path, a simulation piston provided to be displaceable by the hydraulic pressure of the pressurized medium supplied from the simulation flow path, and a simulation spring provided to elastically support the simulation piston, and at least one of the inspection valve and the outlet valves is switched to an open state after the pressurized medium in which a hydraulic pressure is formed by the hydraulic pressure supply device causes the simulation piston to generate displacement in a closed state.

The electronic brake system may further include a cut valve provided between a point at which the simulation flow path is branched on the backup flow path and the hydraulic circuit to control the flow of the pressurized medium, wherein when the air introduced therein is discharged to the reservoir side, the cut valve may be switched to a closed state after the pressurized medium in which a hydraulic pressure is formed by the hydraulic pressure supply device causes the simulation piston to generate displacement in an open state.

The master cylinder may include a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit may include a first hydraulic circuit including first and second wheel cylinders, and a second hydraulic circuit including third and fourth wheel cylinders, the backup flow path may include a first backup flow path connecting the first master chamber and the first hydraulic circuit, and a second backup flow path connecting the second master chamber and the second hydraulic circuit, the cut valve may include a first cut valve provided on the first backup flow path to control the flow of the pressurized medium, and a second cut valve provided on the second backup flow path to control the flow of the pressurized medium, and when the air introduced therein is discharged to the reservoir side, the first cut valve may be switched to a closed state after the pressurized medium in which a hydraulic pressure is formed by the hydraulic pressure supply device causes the simulation piston to generate displacement in an open state, and the second cut valve may be maintained in a closed state.

The reservoir flow path may include a first reservoir flow path connecting the first master chamber and the reservoir and provided with the inspection valve, and a second reservoir flow path connecting the second master chamber and the reservoir.

The hydraulic control unit may supply the pressurized medium in which a hydraulic pressure is formed by the hydraulic pressure supply device to the first backup flow path side when the air introduced therein is discharged to the reservoir side.

The master cylinder may include a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit may include a first hydraulic circuit including first and second wheel cylinders, and a second hydraulic circuit including third and fourth wheel cylinders, the first hydraulic circuit may include first and second outlet valves provided to respectively control the flow of the pressurized medium to be discharged from the first and second wheel cylinders to the reservoir, and at least one of the first and second outlet valves may be switched to an open state after the pressurized medium in which a hydraulic pressure is formed by the hydraulic pressure supply device causes the simulation piston to generate displacement in a closed state in order to discharge the air introduced therein to the reservoir side.

The backup flow path may include a first backup flow path connecting the first master chamber and the first hydraulic circuit, and a second backup flow path connecting the second master chamber and the second hydraulic circuit, and the hydraulic control unit may supply the pressurized medium in which a hydraulic pressure is formed by the hydraulic pressure supply device to the first backup flow path side when the air introduced therein is discharged to the reservoir side.

Another aspect of the present disclosure provides an operation method of the electronic brake system including closing the cut valve, the outlet valves, and the dump valve, forming a hydraulic pressure of the pressurized medium by moving the hydraulic piston forward or rearward, supplying the pressurized medium in which the hydraulic pressure formed to the dump controller, the backup flow path, and the hydraulic circuit, and discharging the air introduced therein to the reservoir by opening at least one of the cut valve, the outlet valves, and the dump valve and transferring the pressurized medium in which the hydraulic pressure is formed to the reservoir.

The operation method may further include an inspection valve provided on the reservoir flow path to control the flow of the pressurized medium, wherein the discharging of the air to the reservoir may include switching the inspection valve from a closed state to an open state together with the cut valve when the cut valve is opened.

The discharging of the air to the reservoir may include a first discharge mode for opening the cut valve, a second discharge mode for opening the outlet valves, and a third discharge mode for opening the dump valve, and the first to third discharge modes may be sequentially performed.

Another aspect of the present disclosure provides an operation method of the electronic brake system including closing the cut valve, the inspection valve, and the outlet valves, forming a hydraulic pressure of the pressurized medium by moving the hydraulic piston forward or rearward, supplying the pressurized medium in which the hydraulic pressure formed to the backup flow path and the simulation flow path, generating displacement of the simulation piston by the pressurized medium having the hydraulic pressure, and discharging the air introduced therein to the reservoir by opening at least one of the inspection valve and the outlet valves and transferring the pressurizing medium pressing the simulation piston to the reservoir.

The operation method may further include a cut valve provided between a point at which the simulation flow path is branched on the backup flow path and the hydraulic circuit to control the flow of the pressurized medium, and closing the cut valve after generating displacement of the simulation piston.

The discharging of the air to the reservoir may include maintaining the cut valve in a closed state when the inspection valve is opened.

The discharging of the air to the reservoir may include switching the cut valve from a closed state to an open state together with the outlet valves when the outlet valves are opened.

Advantageous Effects

An electronic brake system and an operation method thereof according to the present embodiment can have the effect of effectively removing and discharging air introduced into the system.

The electronic brake system and the operation method according to the present embodiment can have the effect of quickly removing and discharging air introduced into the system through a simple structure and operation.

The electronic brake system and the operation method thereof according to the present embodiment can have the effect of improving braking performance and operational reliability.

The electronic brake system and the operation method thereof according to the present embodiment can have the effect of implementing stable and effective braking in various operating situations of a vehicle.

DESCRIPTION OF DRAWINGS

FIG. 1 is a hydraulic circuit diagram illustrating an electronic brake system according to the present embodiment.

FIG. 2 is a hydraulic circuit diagram illustrating that the electronic brake system according to the present embodiment performs a first discharge mode.

FIG. 3 is a hydraulic circuit diagram illustrating that the electronic brake system according to the present embodiment performs a second discharge mode.

FIG. 4 is a hydraulic circuit diagram illustrating that the electronic brake system according to the present embodiment performs a third discharge mode.

FIG. 5 is a hydraulic circuit diagram illustrating that the electronic brake system according to the present embodiment performs a fourth discharge mode.

FIG. 6 is a hydraulic circuit diagram illustrating that the electronic brake system according to the present embodiment performs a fifth discharge mode.

FIG. 7 is a hydraulic circuit diagram illustrating that the electronic brake system according to the present embodiment performs a preparation step for sixth and seventh discharge modes.

FIG. 8 is a hydraulic circuit diagram illustrating that the electronic brake system according to the present embodiment performs the sixth discharge mode.

FIG. 9 is a hydraulic circuit diagram illustrating that the electronic brake system according to the present embodiment performs the seventh discharge mode.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a hydraulic circuit diagram illustrating an electronic brake system 100 according to the present embodiment.

Referring to FIG. 1, the electronic brake system 100 according to the present embodiment includes a reservoir 110 in which a pressurized medium is stored, a master cylinder 120 provided to pressurize and discharge the pressurized medium such as brake oil accommodated therein by pressing of a brake pedal 10, a simulation device 130 provided to provide a reaction force against the pressing of the brake pedal 10 to a driver, a hydraulic pressure supply device 140 provided to receive an electrical signal output in response to a pressing force by the driver from a pedal displacement sensor 11 detecting displacement of the brake pedal 10 and to generate a hydraulic pressure of the pressurized medium through a mechanical operation, a hydraulic control unit 150 provided to control the hydraulic pressure provided from the hydraulic pressure supply device 140, hydraulic circuits 160 and 170 having wheel cylinders 20 provided to brake respective wheels RR, RL, FR, and FL as the hydraulic pressure of the pressurized medium is transferred, a dump controller 180 provided between the hydraulic pressure supply device 140 and the reservoir 110 to control a flow of the pressurized medium, backup flow paths 191 and 192 provided to hydraulically connect the master cylinder 120 and the hydraulic circuits 160 and 170, reservoir flow paths 115 and 116 provided to hydraulically connect the reservoir 110 and the master cylinder 120, and an electronic control unit (ECU, not shown) provided to control the hydraulic pressure supply device 140 and various valves based on hydraulic pressure information and pedal displacement information.

The master cylinder 120 may be configured to include at least one hydraulic chamber to pressurize and discharge the pressurized medium therein. The master cylinder 120 may include a first master chamber 121a and a second master chamber 122a, and a first master piston 121 and a second master piston 122 provided in the first and second master chambers 121a and 122a, respectively.

The first master chamber 121a may be formed on an inlet side (right side with reference to FIG. 1) of a cylinder block 129 to which the brake pedal 10 is connected, and the first master piston 121 may be accommodated in the first master chamber 121a so as to be reciprocally movable.

The pressurized medium may be introduced into and discharged from the first master chamber 121a through a first hydraulic port 125a and a second hydraulic port 125b. The first hydraulic port 125a may be connected to the first reservoir flow path 115, which will be described later, to allow the pressurized medium to be introduced into the first master chamber 121a from the reservoir 110 or to allow the pressurized medium to be discharged to the reservoir 110 from the first master chamber 121a, and a first sealing member 126a and a second sealing member 126b may be provided on the front (left side with reference to FIG. 1) and rear (right side with reference to FIG. 1) of the first hydraulic port 125a to seal the first master chamber 121a with respect to the reservoir 110. The second hydraulic port 125b may be connected to the first backup flow path 191, which will be described later, to allow the pressurized medium in the first master chamber 121a to be discharged to the first backup flow path 191 or on the contrary, to allow the pressurized medium to be introduced into the first master chamber 121a from the first backup flow path 191.

The first master piston 121 may be accommodated in the first master chamber 121a to press the pressurized medium accommodated in the first master chamber 121a by forward movement or to generate a negative pressure inside the first master chamber 121a by rearward movement. Specifically, as a volume of the first master chamber 121a decreases when the first master piston 121 is moved forward, the pressurized medium accommodated in the first master chamber 121a may be pressurized to generate a hydraulic pressure. On the contrary, as the volume of the first master chamber 121a increases when the first master piston 121 is moved rearward, the pressure of the pressurized medium accommodated in the first master chamber 121a may decrease, and at the same time a negative pressure may be generated in the first master chamber 121a.

The second master chamber 122a may be formed at an inner side (left side with reference to FIG. 1) of the first master chamber 121a on the cylinder block 129, and the second master piston 122 may be accommodated in the second master chamber 122a so as to be reciprocally movable.

The pressurized medium may be introduced into and discharged from the second master chamber 122a through a third hydraulic port 125c and a fourth hydraulic port 125d. The third hydraulic port 125c may be connected to the second reservoir flow path 116, which will be described later, to allow the pressurized medium to be introduced into the second master chamber 122a from the reservoir 110 or to allow the pressurized medium to be discharged to the reservoir 110 from the second master chamber 122a, and a third sealing member 126c and a fourth sealing member 126d may be provided on the front (left side with reference to FIG. 1) and rear (right side with reference to FIG. 1) of the third hydraulic port 125c to seal the second master chamber 122a with respect to the reservoir 110. The fourth hydraulic port 125d may be connected to the second backup flow path 192, which will be described later, to allow the pressurized medium in the second master chamber 122a to be discharged to the second backup flow path 192 or on the contrary, to allow the pressurized medium to be introduced into the second master chamber 122a from the second backup flow path 192.

The second master piston 122 may be accommodated in the second master chamber 122a to press the pressurized medium accommodated in the second master chamber 122a by forward movement or to generate a negative pressure inside the second master chamber 122a by rearward movement. Specifically, as a volume of the second master chamber 122a decreases when the second master piston 122 is moved forward, the pressurized medium accommodated in the second master chamber 122a may be pressurized to generate a hydraulic pressure. On the contrary, as the volume of the second master chamber 122a increases when the second master piston 122 is moved rearward, the pressure of the pressurized medium accommodated in the second master chamber 122a may decrease, and at the same time a negative pressure may be generated in the second master chamber 122a.

The master cylinder 120 according to the present embodiment is provided with the two master chambers 121a and 122a independently, so that safety may be ensured in case of failure of a component. For example, the first master chamber 121a may be connected to the first hydraulic circuit 160 including any two wheels of the right front wheel FR, the left front wheel FL, the left rear wheel RL, and the right rear wheel RR of the vehicle through the first backup flow path 191, which will be described later, the second master chamber 122a may be connected to the second hydraulic circuit 170 including the two other wheels through the second backup flow path 192, and thus even when a problem such as a leak occurs in one of the chambers, braking of the vehicle may be possible.

A first piston spring 124a and a second piston spring 124b are provided to elastically support the first master piston 121 and the second master piston 122, respectively. To this end, the first piston spring 124a may be disposed between a front surface (left end with respect to FIG. 1) of the first master piston 121 and a rear surface (right end with respect to FIG. 1) of the second master piston 122, and the second piston spring 124b may be disposed between a front surface (left end with respect to FIG. 1) of the second master piston 122 and an inner surface of the cylinder block 129. When displacement occurs in the first master piston 121 and the second master piston 122 depending on an operation such as braking, the first piston spring 124a and the second piston spring 124b are compressed, respectively, and after that, when the operation such as braking is released, the first piston spring 124a and the second piston spring 124b is extended by elastic forces so that the first master piston 121 and the second master piston 122 may be returned to their original positions, respectively.

The reservoir 110 may accommodate and store the pressurized medium therein, and may be connected to each component to supply or receive the pressurized medium thereto and therefrom. The reservoir 110 may be hydraulically connected to the first and second master chambers 121a and 122a of the master cylinder 110 by the reservoir flow paths 115 and 116.

Specifically, the first reservoir flow path 115 may have one end communicating with the inside of the reservoir 110 and the other end communicating with the first master chamber 121a, and the second reservoir flow path 116 may have one end communicating with the inside of the reservoir 110 and the other end communicating with the second master chamber 122a.

An inspection valve 118 may be provided on the first reservoir flow path 115 to control the flow of the pressurized medium, and may operate to be switched from a closed state to an open state together with a first cut valve 195, which will be described later, in a first discharge mode for discharging air introduced into the system. A detailed description thereof will be provided later.

The first reservoir flow path 115 may include an inspection check valve 119 provided in parallel with the inspection valve 118. To this end, a bypass flow path 117 connected to front and rear ends of the inspection valve 118 is provided on the first reservoir flow path 115, an inspection check valve 119 is provided on the bypass flow path 117, and the inspection check valve 119 may allow only the flow of the pressurized medium to the first master chamber 121a from the reservoir 110.

The second reservoir flow path 116 communicates the reservoir 110 and the second master chamber 122a with each other, so that in a second discharge mode for discharging air introduced into the system, the introduced air may be discharged to the reservoir 110 by sequentially passing through the second backup flow path 192, the second master chamber 122a, and the second reservoir flow path 116. A detailed description thereof will be provided later.

The hydraulic pressure supply device 140 is provided to receive an electrical signal output in response to the pressing force by the driver from the pedal displacement sensor 11 detecting displacement of the brake pedal 10 so that a hydraulic piston 142 reciprocates and to generate a hydraulic pressure of the pressurized medium through this.

The hydraulic pressure supply device 140 may include a hydraulic pressure providing unit to provide the pressure of the pressurized medium to be transferred to the wheel cylinders 20, and a power supply unit (not shown) to generate power to the hydraulic piston 142 based on the electrical signal of the pedal displacement sensor 11.

The hydraulic pressure providing unit includes a cylinder block 141 provided such that the pressurized medium may be accommodated, the hydraulic piston 142 accommodated in the cylinder block 141, pressure chambers 143 and 144 partitioned by the hydraulic piston 142, and a sealing member 145 provided between the hydraulic piston 142 and the cylinder block 141 to seal the pressure chambers 143 and 144.

The pressure chambers 143 and 144 may include the first pressure chamber 1330 located in the front (left side of the hydraulic piston 142 with respect to FIG. 1) of the hydraulic piston 142, and the second pressure chamber 144 located in the rear (right side of the hydraulic piston 142 with respect to FIG. 1) of the hydraulic piston 142. That is, the first pressure chamber 143 is provided to be partitioned by the cylinder block 141 and a front surface of the hydraulic piston 142 so that a volume thereof varies depending on the movement of the hydraulic piston 142, and the second pressure chamber 144 is provided to be partitioned by the cylinder block 141 and a rear surface of the hydraulic piston 142 so that a volume thereof varies depending on the movement of the hydraulic piston 142.

The first pressure chamber 143 may be hydraulically connected to the hydraulic control unit 150, which will be described later, by a hydraulic flow path, and the second pressure chamber 144 may also be hydraulically connected to the hydraulic control unit 150 by a hydraulic flow path.

The sealing member 145 includes a piston sealing member 145a provided between the hydraulic piston 142 and the cylinder block 141 to seal a gap between the first pressure chamber 143 and the second pressure chamber 144, and a drive shaft sealing member 145b provided between the power supply unit and the cylinder block 141 to seal a gap between the second pressure chamber 144 and an opening of the cylinder block 141. The hydraulic pressure or negative pressure of the first pressure chamber 143 and the second pressure chamber 144 generated by the forward or rearward movement of the hydraulic piston 142 may not leak by being sealed by the piston sealing member 145a and the drive shaft sealing member 145b and may be transferred to the hydraulic flow paths.

The power supply unit may generate and provide power to the hydraulic piston 142 by an electrical signal. As an example, the power supply unit may include a motor for generating a rotational force and a power conversion unit for converting the rotational force of the motor into translational movement of the hydraulic piston 142, but is not limited to the corresponding structure and device.

The hydraulic control unit 150 is provided between the hydraulic pressure supply device 140 and the wheel cylinders 20 such that the operation thereof is controlled by the electronic control unit to adjust the hydraulic pressure to be transferred to the wheel cylinders 20.

The hydraulic control unit 150 may be branched into the first hydraulic circuit 160 configured to control a flow of hydraulic pressure to be transferred to first and second wheel cylinders 21 and 22 among the four wheel cylinders 20, and the second hydraulic circuit 170 configured to control the flow of hydraulic pressure to be transferred to third and fourth wheel cylinders 23 and 24. Although not shown in the drawing, the hydraulic control unit 150 also includes a plurality of hydraulic flow paths and solenoid valves provided between the hydraulic pressure supply device 140 and the first and second hydraulic circuits 160 and 170, thereby precisely controlling the hydraulic pressure transferred from the hydraulic pressure supply device 140.

The first and second hydraulic circuits 160 and 170 may include first to fourth inlet valves 161a, 161b, 171a, and 17b to respectively control the flow of the pressurized medium toward the first to fourth wheel cylinders 20. The first to fourth inlet valves 161a, 161b, 171a, and 17b are disposed on upstream sides of the first to fourth wheel cylinders 20, respectively, and may be provided as a normally open type solenoid valve that operates to be closed when an electric signal is received from the electronic control unit in a normally open state.

The first and second hydraulic circuits 160 and 170 may include first to fourth check valves 163a, 163b, 173a, and 173b provided to be connected in parallel with respect to the first to fourth inlet valves 161a, 161b, 171a, and 17b. The check valves 163a, 163b, 173a, and 173b may be provided on bypass flow paths connecting front sides and rear sides of the first to fourth inlet valves 161a, 161b, 171a, and 17b on the first and second hydraulic circuits 160 and 170, and may allow only the flow of pressurized medium from each of the wheel cylinders 20 to the hydraulic pressure control unit 150 while blocking the flow of the pressurized medium from the hydraulic pressure control unit 150 to the wheel cylinders 20. By the first to fourth check valves 163a, 163b, 173a, and 173b, the hydraulic pressure of the pressurized medium applied to each of the wheel cylinders 20 may be quickly released, and even when the first to fourth inlet valves 161a, 161b, 171a, and 17b do not operate normally, the hydraulic pressure of the pressurized medium applied to the wheel cylinders 20 may be smoothly returned to the hydraulic pressure supply device 1210.

The first hydraulic circuit 160 may include a first outlet valve 162a and a second outlet valve 162b provided to control the flow of the pressurized medium to be directly discharged to the reservoir 110 in order to improve performance when braking of the first and second wheel cylinders 21 and 22 is released. The first and second outlet valves 162a and 162b may sense braking pressure of the first and second wheel cylinders 21 and 22 and may be selectively open when decompression braking is required such as in an ABS dump mode, thereby controlling decompression of the first and second wheel cylinders 21 and 22, and particularly may operate to be switched from a closed state to an open state in a third discharge mode for discharging air introduced into the system, so that the introduced air may be discharged to the reservoir 110 through the hydraulic control unit 150 and the first and second outlet valves 162a and 162b. A detailed description thereof will be provided later.

The first and second outlet valves 162a and 162b may be provided as normally closed type solenoid valves that operate to be open when an electric signal is received from the electronic control unit in a normally closed state.

The second hydraulic circuit 170 may include a third outlet valve 172a and a fourth outlet valve 172b provided to control the flow of the pressurized medium to be directly discharged to the reservoir 110 in order to improve performance when braking of the third and fourth wheel cylinders 23 and 24 is released. The third and fourth outlet valves 172a and 172b may sense braking pressure of the third and fourth wheel cylinders 23 and 24 and may be selectively open when decompression braking is required such as in the ABS dump mode, thereby controlling decompression of the third and fourth wheel cylinders 23 and 24, and particularly may operate to be switched from a closed state to an open state in a fourth discharge mode for discharging air introduced into the system, so that the introduced air may be discharged to the reservoir 110 through the hydraulic control unit 150 and the third and fourth outlet valves 172a and 172b. A detailed description thereof will be provided later.

Like the first and second outlet valves 162a and 162b, the third and fourth outlet valves 172a and 172b may be provided as normally closed type solenoid valves that operate to be open when an electric signal is received from the electronic control unit in a normally closed state.

The simulation device 130 is provided to provide a reaction force to the pressing force by the driver for the operation of the brake pedal 10.

The simulation device 130 may be provided to be branched from the first backup flow path 191, which will be described later, and may provide a reaction force in response to the pressing force applied by the driver to the brake pedal 10, thereby providing a pedal feeling to the driver so that the driver may achieve a precise operation of the brake pedal 10, and thus a braking force of the vehicle also be precisely adjusted.

The simulation device 130 may include a simulation flow path 131 branched from the first backup flow path 191, which will be described later, and connected to the reservoir 110, a pedal simulator 132 provided on the simulation flow path 131, a simulator valve 133 provided at a front end of the pedal simulator 132 to control the flow of the pressurized medium, a bypass flow path 134 provided in parallel with the simulator valve 133 on the simulation flow path 131, and a simulator check valve 135 provided on the bypass flow path 134 to control a flow of a braking fluid.

The simulation flow path 131 may be branched from the first backup flow path 191 connecting the first master chamber 121a and the first hydraulic circuit 160, and a rear end thereof may be connected to the reservoir 110.

The pedal simulator 132 includes a simulation piston 132a provided to be displaceable by the pressurized medium introduced from the first backup flow path 191, a simulation chamber 132b having a volume variable by displacement of the simulation piston 132a and communicating with the reservoir 110 side, and a simulation spring 132c provided to elastically support the simulation piston 132a.

The simulation piston 132a is provided to be displaceable in the simulation chamber 132b by the pressurized medium introduced through the first backup flow path 191 and the simulation flow path 131. Specifically, as displacement is generated in the simulation piston 132a by the hydraulic pressure of the pressurized medium transferred to a front surface (left side with reference to FIG. 1) of the simulation piston 132a through the simulation flow path 131, and a volume of the simulation chamber 132b formed on a rear surface (right side with reference to FIG. 1) of the simulation piston 132a by the displacement of the simulation piston 132a varies, the pressurized medium accommodated in the simulation chamber 132b may be supplied to the reservoir 110 through the simulation flow path 131. The simulation spring 132c is compressed depending on the displacement of the simulation piston 132a by elastically supporting the simulation piston 132a, and a resulting elastic restoring force is transmitted to the driver, so that the driver may be provided with a pedal feeling.

In addition, in a sixth discharge mode and a seventh discharge mode for discharging air introduced into the system, the simulation piston 132*a* may be displaced by receiving the pressurized medium in which a hydraulic pressure is formed by the hydraulic pressure supply device 140, and then discharges the pressurized medium toward the simulation flow path 131 and the first backup flow path 191 while returning to an original position by the simulation spring 132*c*, so that the introduced air may also be discharged. A detailed description thereof will be provided later.

Although the simulation spring 132*c* illustrated in the drawing is provided as a coil spring as an example that may provide an elastic force to the simulation piston 132*a*, the simulation spring 132*c* may have various structures capable of providing an elastic restoring force while storing an elastic force. For example, various members made of a material such as rubber or capable of storing an elastic force such as a leaf spring may be provided.

The simulator valve 133 may be provided on the simulation flow path 131 connecting the first backup flow path 191 and the pedal simulator 132 to control the flow of the pressurized medium. The simulator valve 133 may be provided as a normally closed type solenoid valve that is maintained in a normally closed state, and may be opened when the driver applies a pressing force to the brake pedal 10 to transfer the pressurized medium, which is introduced into the simulation flow path 131 from the first master chamber 121*a* through the first backup flow path 191, to the front surface of the simulation piston 132*a*. In the sixth discharge mode and the seventh discharge mode for discharging air introduced into the system, specifically, the simulation device 130, the simulator valve 133 may be maintained in an open state so that the pressurized medium having a hydraulic pressure generated by the hydraulic pressure supply device 140 may be transferred to the front surface of the simulation piston 132*a* and discharged at the same time.

The simulator check valve 135 connected in parallel to the simulator valve 134 may be provided on the simulation flow path 131. Specifically, the simulator check valve 135 is provided on the bypass flow path 134 connecting the front and rear ends of the simulator valve 133 on the simulation flow path 131 to allow only the flow of the pressurized medium from the pedal simulator 132 to the first backup flow path 191. Accordingly, when the driver applies a pressing force to the brake pedal 10, the pressurized medium in the first master chamber 121*a* is transferred to the pedal simulator 132 by sequentially passing through the first backup flow path 192 and the simulator valve 133 of the simulation flow path 131, and when the pressing force of the brake pedal 10 is released, the pressurized medium in a front side of the simulation piston 132*a* returns to the first backup flow path 191 and the first master chamber 121*a* through the simulator valve 133 and the simulator check valve 135, so that a quick return of the pressurized medium may be achieved. Furthermore, even when the hydraulic pressure of the pressurized medium pressing the simulation piston 132*a* is higher than the hydraulic pressure of the pressurized medium on the first master chamber 121*a* or the first backup flow path 191, the pressurized medium is discharged to the first master chamber 121*a* through the simulator check valve 135, so that the pedal simulator 132 may quickly return to a ready-to-operate state.

Describing the operation of the simulation device 130, when the driver presses and operates the brake pedal 10, the simulator valve 133 is opened so that the pressurized medium in the first master chamber 121*a* is supplied and pressurized to the front surface of the simulation piston 132*a* by sequentially passing through the first backup flow path 191 and the simulation flow path 131, and thus displacement is generated in the simulation piston 132*a* and the simulation spring 132*c* is compressed, so that a pedal feeling is provided to the driver by the elastic restoring force of the simulation spring 132*c*. At this time, the first cut valve 195 provided on the first backup flow path 191 is closed, and the pressurized medium discharged from the first master chamber 121*a* may be completely supplied to the simulation flow path 131. The pressurized medium filled in the simulation chamber 132*b* is transferred to the reservoir 110 through the simulation flow path 131. Thereafter, when the driver releases the pressing force of the brake pedal 10, as the simulation spring 132*c* is extended by the elastic force, the simulation piston 132*a* is returned to the original position, and the pressurized medium pressurizing the front surface of the simulation piston 132*a* is supplied to the first backup flow path 191 through the simulator valve 134 and the simulator check valve 135 and returned to the first master chamber 121*a*. At this time, the pressurized medium may be supplied from the reservoir 110 to the simulation chamber 132*b* so that the inside of the simulation chamber 132*b* may be filled again with the pressurized medium.

As such, because the inside of the simulation chamber 132*b* is always filled with the pressurized medium, when the pedal simulator 132 is operated, friction of the simulation piston 132*a* is minimized, so that durability of the pedal simulator 132 may be improved, and intrusion of foreign substances from the outside may be blocked.

The dump controller 180 may include at least one dump flow path 181 connecting the hydraulic pressure supply device 140 and the reservoir 110, and at least one dump valve 182 provided on the dump flow path 181, and the dump valve 182 is electrically operated and controlled by the electronic control unit.

Specifically, the first pressure chamber 143 and the second pressure chamber 144 of the hydraulic pressure supply device 140 may be connected to the reservoir 110 through the dump controller 180. The dump controller 180 may include a first dump flow path 181*a* connecting the first pressure chamber 143 and the reservoir 110, and a second dump flow path 181*b* connecting the second pressure chamber 144 and the reservoir 110, and the dump valve 182 may be provided on at least one of the first dump flow path 181*a* and the second dump flow path 181*b* to control the flow of the pressurized medium through the dump flow path 181. Although FIG. 1 illustrates that the dump valve 182 is provided on the second dump flow path 181*b* connecting the second pressure chamber 144 and the reservoir 110 and provided as a normally open type solenoid valve that operates to be closed when an electric signal is received from the electronic control unit in a normally open state, the installation location and number of the dump valves are not limited thereto, and as long as the hydraulic pressure supply device 140 and the reservoir 110 may be connected by the dump flow path 181 and the flow of the pressurized medium may be controlled through the dump valve 182, various numbers of dump valves may be installed at various locations.

In a fifth discharge mode for discharging air introduced into the system, the dump valve 182 operates to be switched from a closed state to an open state, so that the introduced air may be discharged to the reservoir 110 through the dump flow path 181. A detailed description thereof will be provided later.

The electronic brake system 100 according to the present embodiment may include the first and second backup flow paths 191 and 192 for implementing braking by directly supplying the pressurized medium discharged from the master cylinder 120 to the wheel cylinders when a normal operation is not possible due to a malfunction of a device or the like. A mode in which the hydraulic pressure of the master cylinder 120 is directly transmitted to the wheel cylinders is referred to as a fallback mode. The first backup flow path 191 may be provided to connect a first master chamber 111*a* of the master cylinder 120 and the first hydraulic circuit 160, and the second backup flow path 192 may be provided to connect a second master chamber 112*a* of the master cylinder 120 and the second hydraulic circuit 170. The first backup flow path 191 may be connected to a front end of the first and second inlet valves 161*a* and 161*b* on the first hydraulic circuit 160, and the second backup flow path 192 may be connected to a front end of the third and fourth inlet valves 171*a* and 171*b* on the second hydraulic circuit 170.

The first cut valve 195 for controlling bidirectional flows of the pressurized medium may be provided on the first backup flow path 191, and a second cut valve 196 for controlling bidirectional flows of the pressurized medium may be provided on the second backup flow path 192. The first cut valve 195 and the second cut valve 196 may be provided as normally open type solenoid valves that operate to be closed when a closing signal is received from the electronic control unit in a normally open state.

When the first and second cut valves 195 and 196 are closed, the pressurized medium in the master cylinder 120 may be prevented from being directly transmitted to the wheel cylinders 20, and at the same time the hydraulic pressure provided from the hydraulic pressure supply device 140 may be supplied to the wheel cylinders 20 through the hydraulic control unit 150, and when the first and second cut valves 195 and 196 are opened, the pressurized medium pressurized in the master cylinder 120 may be directly supplied to the wheel cylinders 20 through the first and second backup flow paths 191 and 192 to perform braking.

In the first discharge mode for discharging air introduced into the system, the first cut valve 195 operates to be switched from a closed state to an open state together with the inspection valve 118, so that the introduced air may be discharged to the reservoir 110 by sequentially passing through the first backup flow path 191, the first master chamber 111*a*, and the first reservoir flow path 115. Also, the second cut valve 196 operates to be switched from a closed state to an open state in the second discharge mode for discharging air introduced into the system, so that the introduced air may be discharged to the reservoir 110 by sequentially passing through the second backup flow path 196, the second master chamber 112*a*, and the second reservoir flow path 116. A detailed description thereof will be provided later.

In the sixth discharge mode for discharging air introduced into the simulation device 130 side, the first cut valve 195 is maintained in the open state so that the pressurized medium having a hydraulic pressure formed by the hydraulic pressure supply device 140 may be transferred to the simulation flow path 131, and may operate to be switched to the closed state at the same time as or just before the switching of the inspection valve 118 to the closed state after the displacement of the simulation piston 132*a* is generated. Accordingly, the introduced air may be discharged to the reservoir 110 by sequentially passing through the simulation flow path 131, the first backup flow path 191, the first master chamber 111*a*, and the first reservoir flow path 115. In the seventh discharge mode for discharging air introduced into the simulation device 130 side, the first cut valve 195 may be maintained in the open state so that the pressurized medium having a hydraulic pressure formed by the hydraulic pressure supply device 140 may be transferred to the simulation flow path 131, and at the same time may be discharged to the first and second outlet valves 162*a* and 162*b*.

In the first and seventh discharge modes for discharging air introduced into the system, the second cut valve 196 may be maintained in the closed state to prevent the pressurized medium having a hydraulic pressure formed by the hydraulic pressure supply device 140 from leaking into the second master chamber 122*a* side.

The electronic brake system 100 according to the present embodiment may include at least one pressure sensor PS to detect the hydraulic pressure of the pressurized medium provided by the hydraulic pressure supply device 140. Although the drawing illustrates that the pressure sensors PS are provided on the front end of the third and fourth inlet valves 171*a* and 171*b* of the second hydraulic circuit 170 and on the first backup flow path 191 to detect the hydraulic pressure of the pressurized medium provided by the hydraulic pressure supply device 140, the location and number of pressure sensors are not limited thereto, and as long as the hydraulic pressure may be detected, various numbers of pressure sensors may be disposed at various locations.

Hereinafter, an operation method of the electronic brake system 100 according to the present embodiment will be described.

Air is inevitably introduced into the electronic brake system 100 due to repeated braking operations in the process of generating a hydraulic pressure through the master cylinder 120 or the hydraulic pressure supply device 140 using the pressurized medium or due to a component installation process. When air is present in the electronic brake system 100, because smooth hydraulic pressure generation of the hydraulic pressure supply device 140 is hindered, not only the braking performance of the vehicle is deteriorated, but also a sense of heterogeneity in the operation of the brake pedal 10 of the driver by the simulation device 130 may occur. Accordingly, the electronic brake system 100 according to the present embodiment includes discharge modes capable of removing or discharging air introduced therein.

The first to seventh discharge modes of the electronic brake system 100 according to the present embodiment described below may be performed sequentially, or any one or a plurality of the discharge modes may be performed repeatedly as needed.

FIG. 2 is a hydraulic circuit diagram illustrating that the electronic brake system according to the present embodiment performs the first discharge mode.

Referring to FIG. 2, the electronic control unit may generate a hydraulic pressure of the pressurized medium by moving the hydraulic piston 142 of the hydraulic pressure supply device 140 forward or rearward, and may determine whether air is present in the system by comparing and analyzing pressure values measured and detected by the pressure sensor PS. Specifically, the electronic control unit may compare an expected hydraulic pressure generation value of the pressurized medium depending on a displacement amount of the hydraulic piston 142 of the hydraulic pressure supply device 140 or an operation amount of a motor (not shown) and an actual hydraulic pressure value of the pressurized medium measured by the pressure sensor PS, and may determine as a normal state by determining that air is not introduced into the system when the two hydraulic pressure values are coincided with each other. Unlike the above, when the actual hydraulic pressure value of the pressurized medium measured by the pressure sensor PS is smaller than the expected hydraulic pressure generation value of the pressurized medium depending on the displacement amount of the hydraulic piston 142 of the hydraulic pressure supply device 140 or the operation amount of the motor (not shown), this is because the hydraulic pressure of the pressurized medium is not formed stably from the hydraulic supply device 140, and thus the electronic control unit may determine that air is present in the system and enter the discharge mode.

When determining whether air is present in the system, the electronic control unit switches the first and second cut valves 195 and 196, the first to fourth inlet valves 161*a*, 161*b*, 171*a*, 171*b*, the dump valve 182, and the like to the closed state so that the flow paths around the hydraulic pressure supply device 140 are configured as a closed circuit for quick and accurate determination of the pressure sensor PS, and then may perform an inspection.

In the first discharge mode, the electronic control unit switches the first and second cut valves 195 and 196 and the inspection valve 118 to the closed state, and then moves the hydraulic piston 142 of the hydraulic pressure supply device 140 forward to form a hydraulic pressure of the pressurized medium. At this time, in order to quickly perform the first discharge mode, the electronic control unit may also switch the first to fourth inlet valves 161*a*, 161*b*, 171*a*, and 171*b* to a closed state and then may move the hydraulic piston 142 forward.

After forming the hydraulic pressure of the pressurized medium through the hydraulic pressure supply device 140, the electronic control unit controls the valves of the hydraulic control unit 150 to supply the pressurized medium having the hydraulic pressure to the first hydraulic circuit 160 side or the flow path to which the first backup flow path 191 is connected, and at the same time switches the first cut valve 195 and the inspection valve 118 to the open state. As the pressurized medium in which the hydraulic pressure is formed by the hydraulic pressure supply device 140 is discharged to the reservoir 110 by sequentially passing through the hydraulic control unit 150, the first backup flow path 191, the first master chamber 111*a*, and the first reservoir flow path 115, the air present in the pressurized medium may also be discharged to the reservoir 110, thereby removing and discharging the air introduced into the brake system 100.

In this case, because the simulator valve 133 of the simulation flow path 131 branched from the first backup flow path 191 is maintained in a closed state, the pressurized medium in which the hydraulic pressure is formed does not leak into the simulation device 130 side.

Although FIG. 2 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, in order to prevent leakage of the pressurized medium through the dump flow path 181, the electronic control unit may also switch the dump valve 182 to the closed state, move the hydraulic piston 142 rearward to form a hydraulic pressure of the pressurized medium, and then switch simultaneously the first cut valve 195 and the inspection valve 118 to the open state, thereby performing the first discharge mode.

Hereinafter, the second discharge mode of the electronic brake system 100 according to the present embodiment will be described.

FIG. 3 is a hydraulic circuit diagram illustrating that the electronic brake system according to the present embodiment performs the second discharge mode.

Referring to FIG. 3, as described above, when it is determined that air is present in the system, the electronic control unit may perform the second discharge mode.

In the second discharge mode, the electronic control unit switches the first and second cut valves 195 and 196 and the inspection valve 118 to the closed state, and then moves the hydraulic piston 142 of the hydraulic pressure supply device 140 forward to form a hydraulic pressure of the pressurized medium. At this time, in order to quickly perform the second discharge mode, the electronic control unit may also switch the first to fourth inlet valves 161*a*, 161*b*, 171*a*, and 171*b* to the closed state and then may move the hydraulic piston 142 forward.

After forming the hydraulic pressure of the pressurized medium through the hydraulic pressure supply device 140, the electronic control unit controls the valves of the hydraulic control unit 150 to supply the pressurized medium having the hydraulic pressure to the second hydraulic circuit 167 side or the flow path to which the second backup flow path 192 is connected, and at the same time switches the second cut valve 196 to the open state. As the pressurized medium in which the hydraulic pressure is formed by the hydraulic pressure supply device 140 is discharged to the reservoir 110 by sequentially passing through the hydraulic control unit 150, the second backup flow path 192, the second master chamber 112*a*, and the second reservoir flow path 116, the air present in the pressurized medium may also be discharged to the reservoir 110, thereby removing and discharging the air introduced into the brake system 100.

Although FIG. 3 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, in order to prevent leakage of the pressurized medium through the dump flow path 181, the electronic control unit may also switch the dump valve 182 to the closed state, move the hydraulic piston 142 rearward to form a hydraulic pressure of the pressurized medium, and then switch the second cut valve 196 to the open state, thereby performing the second discharge mode.

Hereinafter, the third discharge mode of the electronic brake system 100 according to the present embodiment will be described.

FIG. 4 is a hydraulic circuit diagram illustrating that the electronic brake system according to the present embodiment performs the third discharge mode.

Referring to FIG. 4, as described above, when it is determined that air is present in the system, the electronic control unit may perform the third discharge mode.

In the third discharge mode, the electronic control unit switches the first and second cut valves 195 and 196 to the closed state, and then moves the hydraulic piston 142 of the hydraulic pressure supply device 140 forward to form a hydraulic pressure of the pressurized medium.

After forming the hydraulic pressure of the pressurized medium through the hydraulic pressure supply device 140, the electronic control unit controls the valves of the hydraulic control unit 150 to supply the pressurized medium having the hydraulic pressure to the first hydraulic circuit 160 side, and at the same time switches at least one of the first and second outlet valves 162*a* and 162*b* to the open state. The first and second outlet valves 162*a* and 162*b*, which are provided as normally closed type solenoid valves that are maintained in a normally closed state, may be switched to the open state after the hydraulic pressure of the pressurized medium is formed by the hydraulic pressure supply device 140 in an initial state of operation, thereby performing the third discharge mode. As the pressurized medium in which the hydraulic pressure is formed by the hydraulic pressure supply device 140 is discharged to the reservoir 110 by sequentially passing through the hydraulic control unit 150, and at least one of the first and second outlet valves 162*a* and 162*b* of the first hydraulic circuit 160, the air present in the pressurized medium may also be discharged to the reservoir 110, thereby removing and discharging the air introduced into the brake system 100.

In this case, because the first and second inlet valves 161*a* and 161*b* of the first hydraulic circuit 160 are maintained in the open state, the pressurized medium in which the hydraulic pressure is formed may be transferred to the first and second outlet valves 162*a* and 162*b* by passing through the first and second inlet valves 161*a* and 161*b*. On the other hand, the electronic control unit switches the first to fourth inlet valves 161*a*, 161*b*, 171*a*, 171*b* to the closed state so that the hydraulic pressure formation of the pressurized medium by the hydraulic pressure supply device 140 may be quickly performed and then moves the hydraulic piston 142 forward, and then switches the first and second inlet valves 161*a* and 161*b* and the first and second outlet valves 162*a* and 162*b* together to the open state, thereby performing the third discharge mode.

Although FIG. 4 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, in order to prevent leakage of the pressurized medium through the dump flow path 181, the electronic control unit may also switch the dump valve 182 to the closed state, move the hydraulic piston 142 rearward to form a hydraulic pressure of the pressurized medium, and then switch at least one of the first and second outlet valves 162*a* and 162*b* to the open state, thereby performing the third discharge mode.

Hereinafter, the fourth discharge mode of the electronic brake system 100 according to the present embodiment will be described.

FIG. 5 is a hydraulic circuit diagram illustrating that the electronic brake system according to the present embodiment performs the fourth discharge mode.

Referring to FIG. 5, as described above, when it is determined that air is present in the system, the electronic control unit may perform the fourth discharge mode.

In the fourth discharge mode, the electronic control unit switches the first and second cut valves 195 and 196 to the closed state, and then moves the hydraulic piston 142 of the hydraulic pressure supply device 140 forward to form a hydraulic pressure of the pressurized medium.

After forming the hydraulic pressure of the pressurized medium through the hydraulic pressure supply device 140, the electronic control unit controls the valves of the hydraulic control unit 150 to supply the pressurized medium having the hydraulic pressure to the second hydraulic circuit 167 side, and at the same time switches at least one of the third and fourth outlet valves 172*a* and 172*b* to the open state. The third and fourth outlet valves 172*a* and 172*b*, which are provided as normally closed type solenoid valves that are maintained in a normally closed state, may be switched to the open state after the hydraulic pressure of the pressurized medium is formed by the hydraulic pressure supply device 140 in an initial state of operation, thereby performing the fourth discharge mode. As the pressurized medium in which the hydraulic pressure is formed by the hydraulic pressure supply device 140 is discharged to the reservoir 110 by sequentially passing through the hydraulic control unit 150, and at least one of the third and fourth outlet valves 172*a* and 172*b* of the second hydraulic circuit 170, the air present in the pressurized medium may also be discharged to the reservoir 110, thereby removing and discharging the air introduced into the brake system 100.

In this case, because the third and fourth inlet valves 171*a* and 171*b* of the second hydraulic circuit 170 are maintained in the open state, the pressurized medium in which the hydraulic pressure is formed may be transferred to the third and fourth outlet valves 172*a* and 172*b* by passing through the third and fourth inlet valves 171*a* and 171*b*. On the other hand, the electronic control unit switches the first to fourth inlet valves 161*a*, 161*b*, 171*a*, 171*b* to the closed state so that the hydraulic pressure formation of the pressurized medium by the hydraulic pressure supply device 140 may be quickly performed and then moves the hydraulic piston 142 forward, and then switches the third and fourth inlet valves 171*a* and 171*b* and the third and fourth outlet valves 172*a* and 172*b* together to the open state, thereby performing the fourth discharge mode.

Although FIG. 5 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, in order to prevent leakage of the pressurized medium through the dump flow path 181, the electronic control unit may also switch the dump valve 182 to the closed state, move the hydraulic piston 142 rearward to form a hydraulic pressure of the pressurized medium, and then switch at least one of the third and fourth outlet valves 172*a* and 172*b* to the open state, thereby performing the fourth discharge mode.

Hereinafter, the fifth discharge mode of the electronic brake system 100 according to the present embodiment will be described.

FIG. 6 is a hydraulic circuit diagram illustrating that the electronic brake system according to the present embodiment performs the fifth discharge mode.

Referring to FIG. 6, as described above, when it is determined that air is present in the system, the electronic control unit may perform the fifth discharge mode.

In the fifth discharge mode, the electronic control unit switches the dump valve 182 to the closed state, and then moves the hydraulic piston 142 of the hydraulic pressure supply device 140 rearward to form a hydraulic pressure of the pressurized medium. At this time, in order to quickly perform the fifth discharge mode, the electronic control unit may also switch the first to fourth inlet valves 161*a*, 161*b*, 171*a*, and 171*b* to the closed state, or prevent the pressurized medium having the hydraulic pressure formed through a valve control of the hydraulic control unit 150 from leaking toward the hydraulic control unit 150, and then may move the hydraulic piston 142 rearward.

After forming the hydraulic pressure of the pressurized medium through the hydraulic pressure supply device 140, the electronic control unit controls the valves of the hydraulic control unit 150 to prevent the pressurized medium having the hydraulic pressure from being supplied to the first and second hydraulic circuits 160 and 170, and at the same time switches the dump valve 182 to the open state. As the pressurized medium in which the hydraulic pressure is formed by the hydraulic pressure supply device 140 is discharged to the reservoir 110 by passing through the dump flow path 181, the air present in the pressurized medium may also be discharged to the reservoir 110, thereby removing and discharging the air introduced into the brake system 100.

Although FIG. 6 illustrates that the dump valve 182 is provided on the second dump flow path 181b connected to the second pressure chamber 144, the present disclosure is not limited thereto, and when the dump valve 182 is provided on the first dump flow path 181a connected to the first pressure chamber 143, the hydraulic pressure of the pressurized medium may be formed by the forward movement of the hydraulic piston 142, and the dump valve 182 may be opened to discharge air. In addition, when a plurality of the dump valves 182 is provided and disposed on the first and second dump flow paths 181, respectively, the fifth discharge mode may be performed through the control of the dump valve 182 together with repeated operations of the forward movement and the rearward movement of the hydraulic piston 142.

Hereinafter, the sixth and seventh discharge modes for discharging air introduced into the simulation device 130 side of the electronic brake system 100 according to the present embodiment will be described.

FIG. 7 is a hydraulic circuit diagram illustrating a preparation step before performing the sixth and seventh discharge modes of the electronic brake system according to the present embodiment, and FIG. 8 is a hydraulic circuit diagram illustrating that the electronic brake system according to the present embodiment performs the sixth discharge mode.

The electronic control unit may generate a hydraulic pressure of the pressurized medium by moving the hydraulic piston 142 of the hydraulic pressure supply device 140 forward or rearward, and may determine whether air is present in the system by comparing and analyzing pressure values measured and detected by the pressure sensor PS. Specifically, the electronic control unit may compare an expected hydraulic pressure generation value of the pressurized medium depending on a displacement amount of the hydraulic piston 142 of the hydraulic pressure supply device 140 or an operation amount of a motor (not shown) and an actual hydraulic pressure value of the pressurized medium measured by the pressure sensor PS, and may determine as a normal state by determining that air is not introduced into the system when the two hydraulic pressure values are coincided with each other. Unlike the above, when the actual hydraulic pressure value of the pressurized medium measured by the pressure sensor PS is smaller than the expected hydraulic pressure generation value of the pressurized medium depending on the displacement amount of the hydraulic piston 142 of the hydraulic pressure supply device 140 or the operation amount of the motor (not shown), this is because the hydraulic pressure of the pressurized medium is not formed stably from the hydraulic supply device 140, and thus the electronic control unit may determine that air is present in the system and enter a preparation step.

Referring to FIG. 7, the electronic brake system according to the present embodiment may perform the preparation step before entering the sixth and seventh discharge modes for discharging air introduced into or present in the simulation device 130 side. In the preparation step, the electronic control unit switches the second cut valve 196 and the inspection valve 118 to the closed state and the first cut valve 195 and the simulator valve 133 to the open state, and then forms the hydraulic pressure of the pressurized medium by moving the hydraulic piston 142 of the hydraulic pressure supply device 140 forward. At this time, the electronic control unit may switch the first to fourth inlet valves 161a, 161b, 171a, 171b to the closed state to quickly perform the sixth discharge mode, and then may move the hydraulic piston 142 forward.

The electronic control unit controls the valves of the hydraulic control unit 150 to supply the pressurized medium in which the hydraulic pressure is formed by the hydraulic pressure supply device 140 to the first backup flow path 191 side. The pressurized medium supplied to the first backup flow path 191 side is transferred along the first backup flow path 191 and the simulation flow path 131 and presses the front surface of the simulation piston 132a to generate displacement.

Although FIG. 7 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, the hydraulic piston 142 may be moved rearward to form a hydraulic pressure of the pressurized medium, and the pressurized medium may be transferred along the first backup flow path 191 and the simulation flow path 131 to press the front surface of the simulation piston 132a.

After the preparation step, the sixth discharge mode is performed. Referring to FIG. 8, in the sixth discharge mode, the first cut valve 195 is switched to the closed state, and at the same time, or the first cut valve 195 is switched to the closed state, and then the inspection valve 118 is switched to the open state. Accordingly, as the pressurized medium pressing the front surface of the simulation piston 132a is discharged to the reservoir 110 by sequentially passing through the simulation flow path 131, the first backup flow path 191, the first master chamber 111a, and the first reservoir flow path 115, the air present in the pressurized medium may also be discharged to the reservoir 110, thereby removing and discharging the air introduced into the brake system 100.

The simulator valve 133 is maintained in the open state from a moment when the pressurized medium in which hydraulic pressure is formed by the hydraulic pressure supply device in the preparation step is transferred to the front surface of the simulation piston 132a until a moment when the pressurized medium pressing the front surface of the simulation piston 132a is discharged by the sixth discharge mode.

In this case, the displacement amount of the hydraulic piston 142 may change within a range of a maximum allowable displacement amount of the simulation piston 132a in consideration of a ratio of a cross-sectional area of the simulation piston 132a to a cross-sectional area of the hydraulic piston 142. Or the hydraulic pressure of the pressurized medium provided by the hydraulic piston 142 may act within a range of a maximum acceptable hydraulic pressure value of the pedal simulator 132.

Hereinafter, the seventh discharge mode of the electronic brake system 100 according to the present embodiment will be described.

FIG. 9 is a hydraulic circuit diagram illustrating that the electronic brake system according to the present embodiment performs the seventh discharge mode.

In the preparation step, the electronic control unit switches the second cut valve 196 and the inspection valve 118 to the closed state and switches the first cut valve 195 and the simulator valve 133 to the open state, and then forms a hydraulic pressure of the pressurized medium by moving the hydraulic piston 142 of the hydraulic pressure supply device 140 forward. At this time, in order to quickly perform the seventh discharge mode, the electronic control unit may switch the first to fourth inlet valves 161a, 161b, 171a, 171b to the closed state and then move the hydraulic piston 142 forward.

The electronic control unit controls the valves of the hydraulic control unit 150 to supply the pressurized medium in which a hydraulic pressure is formed by the hydraulic pressure supply device 140 to the first backup flow path 191 side. The pressurized medium supplied to the first backup flow path 191 side is transferred along the first backup flow path 191 and the simulation flow path 131 and presses the front surface of the simulation piston 132a to generate displacement.

Although FIG. 7 illustrates that the hydraulic piston 142 moves forward to form a hydraulic pressure of the pressurized medium, the present disclosure is not limited thereto, and a hydraulic pressure of the pressurized medium may be formed by the rearward movement of the hydraulic piston 142. In this case, the hydraulic piston 142 may be moved rearward to form a hydraulic pressure of the pressurized medium, and the pressurized medium may be transferred along the first backup flow path 191 and the simulation flow path 131 to press the front surface of the simulation piston 132a.

After the preparation step, the seventh discharge mode is performed. Referring to FIG. 9, in the seventh discharge mode, at least one of the first and second outlet valves 162a and 162b is switched to the open state. At this time, when the first and second inlet valves 161a and 161b are closed in the preparation step, the first and second inlet valves 161a and 161b are also switched to the open state. The first and second outlet valves 162a and 162b, which are provided as normally closed type solenoid valves that are maintained in a normally closed state, may be switched to the open state when entering the seventh discharge mode in the initial operation state, thereby performing the seventh discharge mode.

Accordingly, as the pressurized medium pressing the front surface of the simulation piston 132a is discharged to the reservoir 110 by sequentially passing through the simulation flow path 131, the first backup flow path 191, and at least one of the first and second outlet valves 162a and 162b of the first hydraulic circuit 160, the air present in the pressurized medium may also be discharged to the reservoir 110, thereby removing and discharging the air introduced into the brake system 100.

The simulator valve 133 is maintained in the open state from the moment when the pressurized medium in which hydraulic pressure is formed by the hydraulic pressure supply device in the preparation step is transferred to the front surface of the simulation piston 132a until the moment when the pressurized medium pressing the front surface of the simulation piston 132a is discharged by the sixth discharge mode.

In this case, the displacement amount of the hydraulic piston 142 may change within the range of the maximum allowable displacement amount of the simulation piston 132a in consideration of the ratio of the cross-sectional area of the simulation piston 132a to the cross-sectional area of the hydraulic piston 142. Or the hydraulic pressure of the pressurized medium provided by the hydraulic piston 142 may act within the range of the maximum acceptable hydraulic pressure value of the pedal simulator 132.

The invention claimed is:

1. An operation method of electronic brake system which includes a reservoir in which a pressurized medium is stored, a master cylinder comprising a master piston connected to a brake pedal and a master chamber provided to have a volume variable by displacement of the master piston, a hydraulic pressure supply device provided to generate a hydraulic pressure by operating a hydraulic piston in response to an electrical signal output in response to the displacement of the brake pedal, a dump controller comprising a dump flow path connecting the hydraulic pressure supply device and the reservoir, and a dump valve provided on the dump flow path to control a flow of the pressurized medium, a hydraulic control unit comprising a plurality of flow paths and valves to control the hydraulic pressure provided from the hydraulic pressure supply device, a hydraulic circuit comprising a plurality of inlet valves provided to respectively control the flow of the pressurized medium to be introduced into a plurality of wheel cylinders, and a plurality of outlet valves provided to control the flow of the pressurized medium to be directly discharged from the plurality of wheel cylinders to the reservoir, a backup flow path connecting the master chamber and the hydraulic circuit and provided with a cut valve to control the flow of the pressurized medium, a reservoir flow path connecting the master chamber and the reservoir and an inspection valve provided on the reservoir flow path to control the flow of the pressurized medium, the operation method comprising:

closing the cut valve, the outlet valves, and the dump valve;

forming a hydraulic pressure of the pressurized medium by moving the hydraulic piston forward or rearward;

supplying the pressurized medium in which the hydraulic pressure formed to the dump controller, the backup flow path, and the hydraulic circuit; and discharging the air introduced therein to the reservoir by opening at least one of the cut valve, the outlet valves, and the dump valve and transferring the pressurized medium in which the hydraulic pressure is formed to the reservoir, wherein the discharging of the air to the reservoir comprises switching the inspection valve from a closed state to an open state together with the cut valve when the cut valve is opened.

2. The operation method of the electronic brake system according to claim 1, wherein the master cylinder comprises a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit comprises a first hydraulic circuit comprising first and second wheel cylinders, and a second hydraulic circuit comprising third and fourth wheel cylinders, the backup flow path comprises a first backup flow path connecting the first master chamber and the first hydraulic circuit, and a second backup flow path connecting the second master chamber and the second hydraulic circuit, and the cut valve comprises a first cut valve provided on the first backup flow path to control the flow of the pressurized medium, and a second cut valve provided on the second backup flow path to control the flow of the pressurized medium.

3. The operation method of the electronic brake system according to claim 2, wherein the reservoir flow path comprises a first reservoir flow path connecting the first master chamber and the reservoir, and a second reservoir flow path connecting the second master chamber and the reservoir, the electronic brake system further comprises an inspection valve provided on the first reservoir flow path to control the flow of the pressurized medium, and the inspection valve, together with the first cut valve, is switched to an open state after a hydraulic pressure of the pressurized medium is formed by the hydraulic pressure supply device in a closed state in order to discharge the air introduced therein to the reservoir side.

4. The operation method of the electronic brake system according to claim 1, wherein the hydraulic pressure supply device further comprises a first pressure chamber formed in front of the hydraulic piston and a second pressure chamber formed in the rear of the hydraulic piston, and when the air introduced therein is discharged to the reservoir side, forms a hydraulic pressure of the pressurized medium in the first pressure chamber by forward movement of the hydraulic piston or forms a hydraulic pressure of the pressurized medium in the second pressure chamber by rearward movement of the hydraulic piston, and supplies the pressurized medium having the hydraulic pressure to the hydraulic control unit.

5. The operation method of the electronic brake system according to claim 1, wherein the hydraulic circuit comprises a first hydraulic circuit comprising first and second wheel cylinders, and a second hydraulic circuit comprising third and fourth wheel cylinders, the first hydraulic circuit comprises first and second outlet valves provided to respectively control the flow of the pressurized medium to be discharged from the first and second wheel cylinders to the reservoir, and the second hydraulic circuit comprises third and fourth outlet valves provided to respectively control the flow of the pressurized medium to be discharged from the third and fourth wheel cylinders to the reservoir.

6. The operation method of the electronic brake system according to claim 1, wherein the hydraulic pressure supply device further comprises a first pressure chamber formed in front of the hydraulic piston and a second pressure chamber formed in the rear of the hydraulic piston, the dump flow path comprises a first dump flow path connecting the first pressure chamber and the reservoir, and a second dump flow path connecting the second pressure chamber and the reservoir, and the dump valve is provided on at least one of the first dump flow path and the second dump flow path.

7. An operation method of an electronic brake system which includes a reservoir in which a pressurized medium is stored, a master cylinder comprising a master piston connected to a brake pedal and a master chamber provided to have a volume variable by displacement of the master piston, a hydraulic pressure supply device provided to generate a hydraulic pressure by operating a hydraulic piston in response to an electrical signal output in response to the displacement of the brake pedal, a hydraulic control unit comprising a plurality of flow paths and valves to control the hydraulic pressure provided from the hydraulic pressure supply device, a hydraulic circuit comprising a plurality of inlet valves provided to respectively control the flow of the pressurized medium to be introduced into a plurality of wheel cylinders, and a plurality of outlet valves provided to control the flow of the pressurized medium to be directly discharged from the plurality of wheel cylinders to the reservoir, a reservoir flow path connecting the master chamber and the reservoir, an inspection valve provided on the reservoir flow path to control the flow of the pressurized medium, a backup flow path connecting the master chamber and the hydraulic circuit and a simulation device provided to provide a reaction force to a pressing force of the brake pedal, wherein the simulation device comprises a simulation flow path branched from the backup flow path, a simulation piston provided to be displaceable by the hydraulic pressure of the pressurized medium supplied from the simulation flow path, and a simulation spring provided to elastically support the simulation piston, the operation method comprising:

closing the cut valve, the inspection valve, and the outlet valves;

forming a hydraulic pressure of the pressurized medium by moving the hydraulic piston forward or rearward;

supplying the pressurized medium in which the hydraulic pressure formed to the backup flow path and the simulation flow path;

generating displacement of the simulation piston by the pressurized medium having the hydraulic pressure; and discharging the air introduced therein to the reservoir by opening at least one of the inspection valve and the outlet valves and transferring the pressurizing medium pressing the simulation piston to the reservoir.

8. The operation method of the electronic brake system according to claim 7, further comprising a cut valve provided between a point at which the simulation flow path is branched on the backup flow path and the hydraulic circuit to control the flow of the pressurized medium, wherein when the air introduced therein is discharged to the reservoir side, the cut valve is switched to a closed state after the pressurized medium in which a hydraulic pressure is formed by the hydraulic pressure supply device causes the simulation piston to generate displacement in an open state.

9. The operation method of the electronic brake system according to claim 8, wherein the master cylinder comprises a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit comprises a first hydraulic circuit comprising first and second wheel cylinders, and a second hydraulic circuit comprising third and fourth wheel cylinders, the backup flow path comprises a first backup flow path connecting the first master chamber and the first hydraulic circuit, and a second backup flow path connecting the second master chamber and the second hydraulic circuit, the cut valve comprises a first cut valve provided on the first backup flow path to control the flow of the pressurized medium, and a second cut valve provided on the second backup flow path to control the flow of the pressurized medium, and when the air introduced therein is discharged to the reservoir side, the first cut valve is switched to a closed state after the pressurized medium in which a hydraulic pressure is formed by the hydraulic pressure supply device causes the simulation piston to generate displacement in an open state, and the second cut valve is maintained in a closed state.

10. The operation method of the electronic brake system according to claim 9, wherein
the reservoir flow path comprises a first reservoir flow path connecting the first master chamber and the reservoir and provided with the inspection valve, and a second reservoir flow path connecting the second master chamber and the reservoir.

11. The operation method of the electronic brake system according to claim 10, wherein
the hydraulic control unit supplies the pressurized medium in which a hydraulic pressure is formed by the hydraulic pressure supply device to the first backup flow path side when the air introduced therein is discharged to the reservoir side.

12. The operation method of the electronic brake system according to claim 7, wherein
the master cylinder comprises a first master piston connected to the brake pedal, a first master chamber provided to have a volume variable by displacement of the first master piston, a second master piston provided to be displaceable depending on displacement of the first master piston or a hydraulic pressure in the first master chamber, and a second master chamber provided to have a volume variable by displacement of the second master piston, the hydraulic circuit comprises a first hydraulic circuit comprising first and second wheel cylinders, and a second hydraulic circuit comprising third and fourth wheel cylinders, the first hydraulic circuit comprises first and second outlet valves provided to respectively control the flow of the pressurized medium to be discharged from the first and second wheel cylinders to the reservoir, and at least one of the first and second outlet valves is switched to an open state after the pressurized medium in which a hydraulic pressure is formed by the hydraulic pressure supply device causes the simulation piston to generate displacement in a closed state in order to discharge the air introduced therein to the reservoir side.

13. The operation method of the electronic brake system according to claim 12, wherein
the backup flow path comprises a first backup flow path connecting the first master chamber and the first hydraulic circuit, and a second backup flow path connecting the second master chamber and the second hydraulic circuit, and the hydraulic control unit supplies the pressurized medium in which a hydraulic pressure is formed by the hydraulic pressure supply device to the first backup flow path side when the air introduced therein is discharged to the reservoir side.

14. The operation method according to claim 13, further comprising
a cut valve provided between a point at which the simulation flow path is branched on the backup flow path and the hydraulic circuit to control the flow of the pressurized medium, and closing the cut valve after generating displacement of the simulation piston.

15. The operation method according to claim 14, wherein
the discharging of the air to the reservoir comprises maintaining the cut valve in a closed state when the inspection valve is opened.

16. The operation method according to claim 14, wherein
the discharging of the air to the reservoir comprises switching the cut valve from a closed state to an open state together with the outlet valves when the outlet valves are opened.

17. The operation method of the electronic brake system according to claim 1, wherein
the discharging of the air to the reservoir comprises a first discharge mode for opening the cut valve, a second discharge mode for opening the outlet valves, and a third discharge mode for opening the dump valve, and the first to third discharge modes are sequentially performed.

* * * * *